US011025734B2

(12) United States Patent
Qu et al.

(10) Patent No.: US 11,025,734 B2
(45) Date of Patent: Jun. 1, 2021

(54) INFORMATION PROCESSING METHOD, TERMINAL, SERVER, AND COMPUTER STORAGE MEDIUM

(71) Applicant: TENCENT TECHNOLOGY (SHENZHEN) COMPANY LIMITED, Shenzhen (CN)

(72) Inventors: Jia Qu, Shenzhen (CN); Yi Xie, Shenzhen (CN); You Zhou, Shenzhen (CN); Dan Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 91 days.

(21) Appl. No.: 16/185,336

(22) Filed: Nov. 9, 2018

(65) Prior Publication Data

US 2019/0082021 A1  Mar. 14, 2019

Related U.S. Application Data

(63) Continuation of application No. PCT/CN2017/093751, filed on Jul. 20, 2017.

(30) Foreign Application Priority Data

Jul. 20, 2016  (CN) .......................... 201610578926.8

(51) Int. Cl.
*G06Q 99/00* (2006.01)
*H04L 29/08* (2006.01)
(Continued)

(52) U.S. Cl.
CPC ............ *H04L 67/22* (2013.01); *G06F 3/0481* (2013.01); *G06F 3/0488* (2013.01); *H04L 29/08* (2013.01); *G06Q 30/0277* (2013.01)

(58) Field of Classification Search
CPC ......... H04L 67/22; H04L 29/08; H04L 67/26; G06F 3/0488; G06F 3/0481; G06Q 30/0277; G06Q 30/0241; G06Q 30/0251
See application file for complete search history.

(56) References Cited

U.S. PATENT DOCUMENTS

| 8,676,651 B2 * | 3/2014 | Lerman ............. G06Q 30/0277 705/14.73 |
| 10,181,132 B1 * | 1/2019 | Delker ............... G06Q 30/0264 |

(Continued)

FOREIGN PATENT DOCUMENTS

| CN | 102542494 A | 7/2012 |
| CN | 104778600 A | 7/2015 |

(Continued)

OTHER PUBLICATIONS

The World Intellectual Property Organization (WIPO) International Search Report for PCT/CN2017/093751 dated Oct. 18, 2017 5 Pages (including translation).
(Continued)

*Primary Examiner* — Philip J Chea
*Assistant Examiner* — Wuji Chen
(74) *Attorney, Agent, or Firm* — Anova Law Group, PLLC

(57) ABSTRACT

An information processing method is provided for a first terminal. The method includes displaying, by the first terminal, first information and an interactive prompt corresponding to the first information; and detecting, by the first terminal, an interactive operation formed based on the interactive prompt to generate operation information of the interactive operation. The method also includes sending, by the first terminal, the generated operation information to a server; receiving response information sent by the server; displaying, by the first terminal, an interaction status based on the response information; receiving, by the first terminal,
(Continued)

colleting-information for collecting at least one to-be-issued benefit sent by the server; and displaying, by the first terminal, the collecting-information. The collecting-information is sent when the server detects that the interaction status meets a preset interaction-completion condition.

20 Claims, 12 Drawing Sheets

(51) Int. Cl.
G06F 3/0488 (2013.01)
G06F 3/0481 (2013.01)
G06Q 30/02 (2012.01)

(56) References Cited

U.S. PATENT DOCUMENTS

| | | | | |
|---|---|---|---|---|
| 2005/0091111 A1* | 4/2005 | Green | | G06Q 30/0262 |
| | | | | 705/14.59 |
| 2006/0041476 A1* | 2/2006 | Zheng | | G06Q 30/0269 |
| | | | | 705/14.53 |
| 2007/0239452 A1* | 10/2007 | Madhavan | | G06Q 30/02 |
| | | | | 704/252 |
| 2008/0059308 A1* | 3/2008 | Gerken | | G06Q 30/0255 |
| | | | | 705/14.44 |
| 2008/0086356 A1* | 4/2008 | Glassman | | G06Q 30/0242 |
| | | | | 705/14.41 |
| 2009/0254435 A1* | 10/2009 | Gu | | G06Q 30/0246 |
| | | | | 705/14.45 |
| 2010/0228630 A1* | 9/2010 | Mikkelsen | | G06Q 30/0269 |
| | | | | 705/14.66 |
| 2011/0106721 A1* | 5/2011 | Nickerson | | G06Q 30/02 |
| | | | | 705/347 |
| 2011/0184742 A1* | 7/2011 | Lynch | | G06Q 30/02 |
| | | | | 705/1.1 |
| 2013/0013393 A1* | 1/2013 | Koonce | | G06Q 30/02 |
| | | | | 705/14.42 |
| 2013/0073402 A1* | 3/2013 | Lerman | | G06Q 30/0241 |
| | | | | 705/14.73 |
| 2014/0310013 A1* | 10/2014 | Ram | | G06Q 10/10 |
| | | | | 705/2 |
| 2015/0186941 A1* | 7/2015 | Anthony | | G06Q 30/0242 |
| | | | | 705/14.41 |
| 2015/0271126 A1 | 9/2015 | Menayas et al. | | |
| 2016/0050466 A1* | 2/2016 | Makhlouf | | G06Q 30/0241 |
| | | | | 725/9 |
| 2016/0179908 A1 | 6/2016 | Johnston et al. | | |
| 2016/0345076 A1* | 11/2016 | Makhlouf | | H04N 21/44222 |

FOREIGN PATENT DOCUMENTS

| | | |
|---|---|---|
| CN | 105100928 A | 11/2015 |
| CN | 106161635 A | 11/2016 |
| WO | WO2013102440 A1 * | 7/2013 ......... G06Q 30/0267 |

OTHER PUBLICATIONS

The State Intellectual Property Office of the People's Republic of China (SIPO) Office Action 1 for 201610578926.8 dated Sep. 20, 2018 7 Pages (including translation).

* cited by examiner

INFORMATION PROCESSING METHOD, TERMINAL, SERVER, AND COMPUTER STORAGE MEDIUM

RELATED APPLICATIONS

This application is a continuation application of PCT Patent Application No. PCT/CN2017/093751, filed on Jul. 20, 2017, which claims priority to Chinese Patent Application No. 201610578926.8, filed on Jul. 20, 2016, content of all of which is incorporated by reference in its entirety.

FIELD OF TECHNOLOGY

This application relates to the field of information technologies and, in particular, to an information processing method, a terminal, a server, and a computer storage medium.

BACKGROUND

Currently, various advertisements exist in video-play applications, social-network applications, and search applications. Sometimes, these advertisements are compulsorily played or displayed. For example, an advertisement is compulsorily played to a user who is not a member of a video site before any video is played. Due to such compulsory playing of advertisement, on one hand, the user's satisfaction degree may be lowered and, on the other hand, the user actually would not watch the advertisement seriously. As a result, the effect of playing the advertisement is bad, and the effective conversion rate of the resource of playing the advertisement is low.

The disclosed methods and systems are directed to solve one or more problems set forth above and other problems.

SUMMARY

Accordingly, embodiments of the present disclosure provide an information processing method, a terminal, a server, and a computer storage medium to resolve the problems of low efficiency of distributing promotion information such as advertisement, low user participation rate in the promotion information, and poor user experience, etc.

According to one aspect of the present disclosure, an information processing method for a first terminal is provided. The method includes displaying, by the first terminal, first information and an interactive prompt corresponding to the first information; and detecting, by the first terminal, an interactive operation formed based on the interactive prompt to generate operation information of the interactive operation. The method also include sending, by the first terminal, the generated operation information to a server; and receiving response information sent by the server based on the operation information. The response information is also based on operation information that is detected and generated by a second terminal, and the operation information of the second terminal being generated based on the interactive prompt. The method further includes displaying, by the first terminal, an interaction status based on the response information; receiving, by the first terminal, colleting-information for collecting at least one to-be-issued benefit sent by the server, the collecting-information being sent when the server detects that the interaction status meets a preset interaction-completion condition; and displaying, by the first terminal, the collecting-information.

According to another aspect of the present disclosure, an information processing method is provided for a server. The method includes receiving operation information sent by a first terminal, and the operation information sent by the first terminal is generated by the first terminal by detecting an interactive operation when displaying first information and an interactive prompt. The method also includes receiving operation information sent by a second terminal, and the operation information sent by the second terminal is generated by the second terminal by detecting an interactive operation when displaying the first information and the interactive prompt. Further, the method includes sending response information to the first terminal based on the operation information respectively sent by the first terminal and the second terminal, the response information being used for the first terminal to display an interaction status; and sending information for collecting at least one to-be-issued benefit to the first terminal when the interaction status meets a preset interaction-completion condition.

According to another aspect of the present disclosure, a non-transitory computer-readable storage medium is provided. The non-transitory computer-readable storage medium stores computer program instructions executable by at least one processor of a first terminal to perform: displaying first information and an interactive prompt corresponding to the first information; detecting an interactive operation formed based on the interactive prompt, to generate operation information of the interactive operation; sending the generated operation information to a server; receiving response information sent by the server based on the operation information, the response information being also based on operation information that is detected and generated by a second terminal, and the operation information of the second terminal being generated based on the interactive prompt; displaying an interaction status based on the response information; receiving colleting-information for collecting at least one to-be-issued benefit sent by the server, the collecting-information being sent when the server detects that the interaction status meets a preset interaction-completion condition; and displaying the collecting-information.

Other aspects of the present disclosure can be understood by those skilled in the art in light of the description, the claims, and the drawings of the present disclosure.

DETAILED DESCRIPTION

The following further describes the technical solutions of the present disclosure in detail with reference to the accompanying drawings and specific embodiments. It should be understood that the preferred embodiments described below are merely intended to describe and explain the present disclosure, but are not intended to limit the present disclosure.

Figure 1:
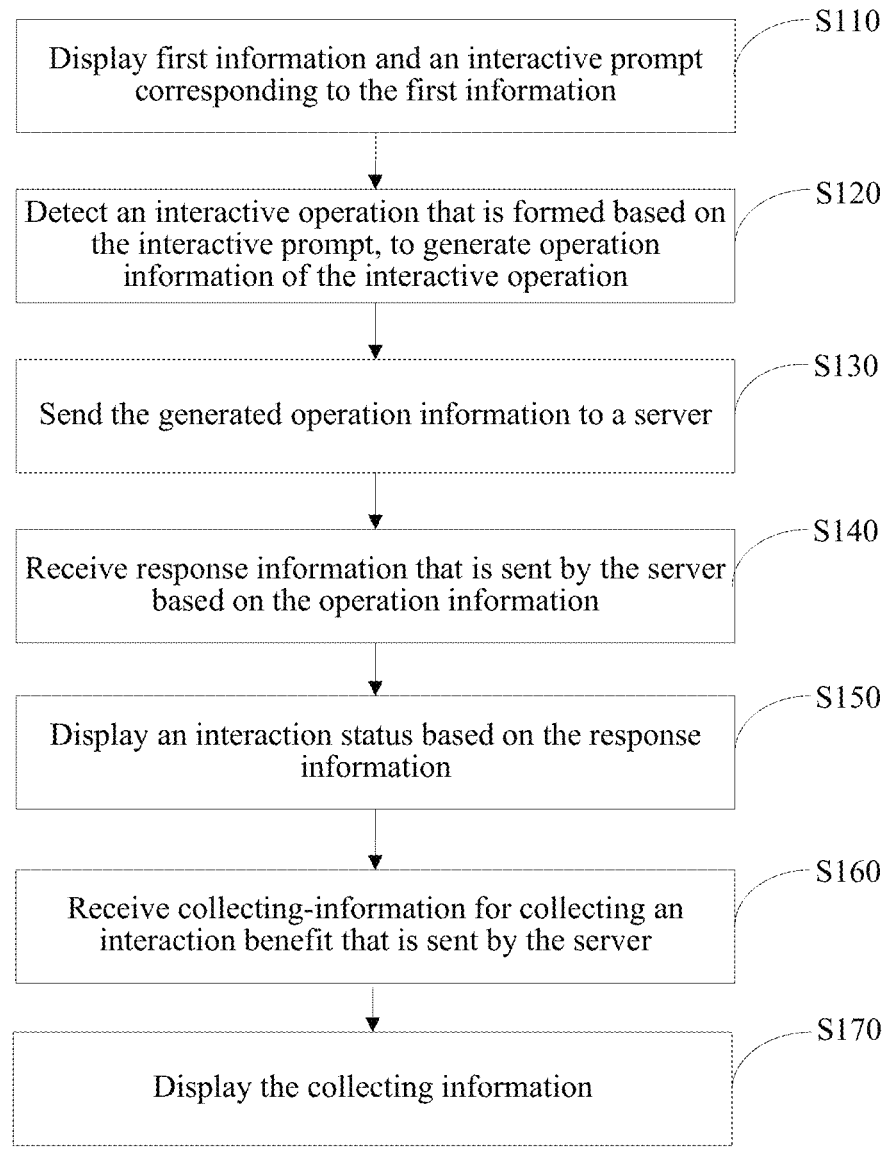
FIG. 1 is a schematic flowchart of an information processing method according to an embodiment of the present disclosure.

As shown in FIG. 1, an embodiment of the present disclosure provides an information processing method for a terminal. The method may include the followings.

Step S110: Displaying first information and an interactive prompt corresponding to the first information.

Step S120: Detecting an interactive operation that is formed based on the interactive prompt, to generate operation information of the interactive operation.

Step S130: Sending the generated operation information to a server.

Step S140: Receiving response information sent by the server based on the operation information, the response information being generated based on the operation information that is detected and generated by a second terminal, and the operation information of the second terminal being generated based on the interactive prompt.

Step S150: Displaying an interaction status based on the response information.

Step S160: Receiving information for collecting an interaction benefit sent by the server, the collecting-information being sent when the server detects that the interaction status meets a preset interaction-completion condition;

Step S170: Displaying the collecting-information.

The information processing method in one embodiment is a method applied to a terminal. The first terminal and the second terminal herein both are terminals and are interactive peer terminals. The terminals may be various types of terminals, such as a notebook computer, a desktop computer, a mobile phone, a tablet computer, or a wearable device.

The interactive peer terminals in one embodiment may be two terminals that perform an interactive operation based on same information prompted on a terminal, i.e., the first information.

The first terminal displays the first information. The first information herein may include various promotion information, such as various advertisement information or government notices or public interest information. An information type of the first information may be video information and/or text and graphic information. The promotion information may be information sent by another electronic device (for example, a server) to the first terminal when an information request of the first terminal is not received.

The interactive prompt is prompt information corresponding to the interactive operation of the first information. The interactive operation herein may include a user entered operation that is detected by using a human-computer interaction interface. The human-computer interaction interface includes a keyboard, a touchscreen, a mouse, a remote controller, or a voice collection device, or various sensors or processing devices for collecting user inputs, such as a sight line tracking device.

The interactive operation may include various operations such as a clicking operation and a sliding operation. Based on the duration of the clicking operation, that is, an action duration for which the clicking operation is acted on the human-computer interaction interface, the clicking operation may further be divided into a short press whose action duration is smaller than a duration threshold, or a long press whose action duration is greater than the duration threshold. The sliding operation may be divided into various types of operations, such as left sliding, right sliding, single-finger sliding, or multi-finger sliding.

The first information and the interactive prompt may be information received from the server before being displayed, or may be information that is pre-buffered locally on the first terminal.

Figure 3:
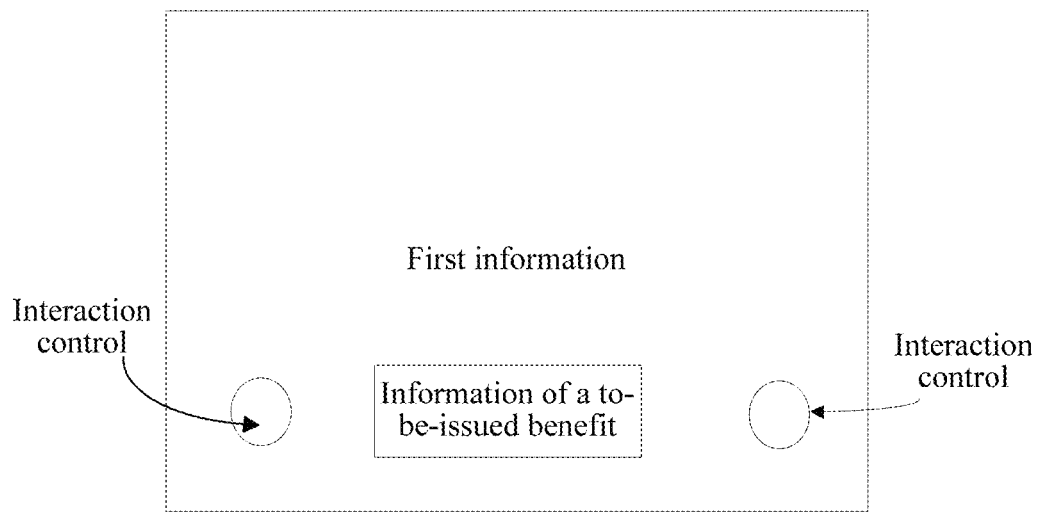
FIG. 3 is a schematic diagram of display effect of a terminal according to an embodiment of the present disclosure.
Figure 4:
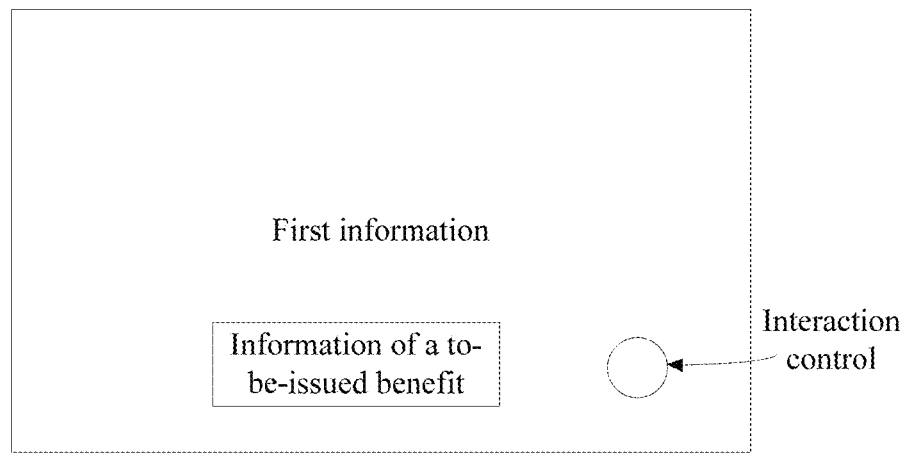
FIG. 4 is a schematic diagram of display effect of another terminal according to an embodiment of the present disclosure.

The interactive operation that is formed based on the interactive prompt may be detected in step S120. For example, as shown in FIG. 3 and FIG. 4, the first terminal displays an interaction control, to prompt to click or press a prompt control. The clicking or pressing operation is the interactive operation. In step S120, the operation information is generated by detecting the interactive operation. The operation information may include an action time, an action duration, or an action pressure of the interactive operation. Two interaction controls are shown in FIG. 3, and only one interaction control is shown in FIG. 4. These interaction controls are displayed in a manner of being superposed on the first information. When displayed in a manner of being superposed on the first information, the interaction control may be selected to be semi-transparent. The action time may include a start time and a termination time of the interactive operation. The action duration may be a time difference of the termination time and the start time. The action pressure may include a force value of a direct action force of the interactive operation on the interaction control, or may be a parameter such as a pressure level corresponding to the force value.

Displaying in a manner of being superposed on the first information in one embodiment of the present disclosure may be: displaying the interaction control covering or over a display layer of the first information.

Step S130 may include sending the detected operation information to the server.

It should be noted that, in some cases, to protect privacy of the user, the server may perform an anonymizing processing on the operation information submitted to the server. Therefore, the operation information is not associated with identity information of the user.

The anonymizing processing may include anonymizing the operation information by using hash, encryption, or information obfuscation technology, so as to protect the privacy of the user.

In some cases, if the user authorizes that the information can be disclosed, the operation information may be associated with the identity information of the user. The identity information of the user may include information such as a user account or a user name that indicates a network identity or a real identity of the user.

In step S140, the operation information generated by the second terminal and forwarded by the server is received. The operation information generated by the second terminal is generated by the second terminal by detecting the interactive operation based on the interactive prompt when displaying the first information.

For example, when the first terminal plays an advertisement A, the second terminal also plays the advertisement A. Both terminals detect interactive operations, and generate operation information that is respectively submitted to the server. The server may forward the operation information in a targeted manner.

In step S150, the first terminal displays the interaction status according to the response information. The interaction status herein may include an interaction progress indicating current completion degree of the interactive operation, or information such as an interaction result indicating a result generated by the interactive operation. Display of the interaction status helps the user to determine a current interaction situation between the first terminal and the second terminal, so as to determine whether to continue or terminate the interaction.

In some embodiments, step S140 may include receiving the operation information sent by the server and detected and generated by the second terminal. In this case, it is equivalent to that the response information includes the operation information that is submitted to the server by the second terminal. Correspondingly, step S150 may include displaying the interaction status based on the operation information generated by the first terminal and the operation information generated by the second terminal. Information describing the interaction status may be interaction status information.

In some other embodiments, step S140 may include receiving the interaction status information sent by the server, the interaction status information being generated by the server according to the operation information that is respectively provided by the first terminal and the second terminal; and step S150 may include displaying the interaction status based on the interaction status information. In one embodiment, the server may generate the interaction status information according to the operation information that is respectively provided by the first terminal and the second terminal, and send the interaction status information to the first terminal. In this way, the first terminal can directly display the interaction status according to the interaction status information. Therefore, the first terminal does not need to display the interaction status according to the two pieces of operation information. For example, an interaction status is the interaction progress. If the interaction progress is related to action durations of two interactive operations, the interaction progress may be indicated by an interaction progress bar displayed on the first terminal.

Figure 10:
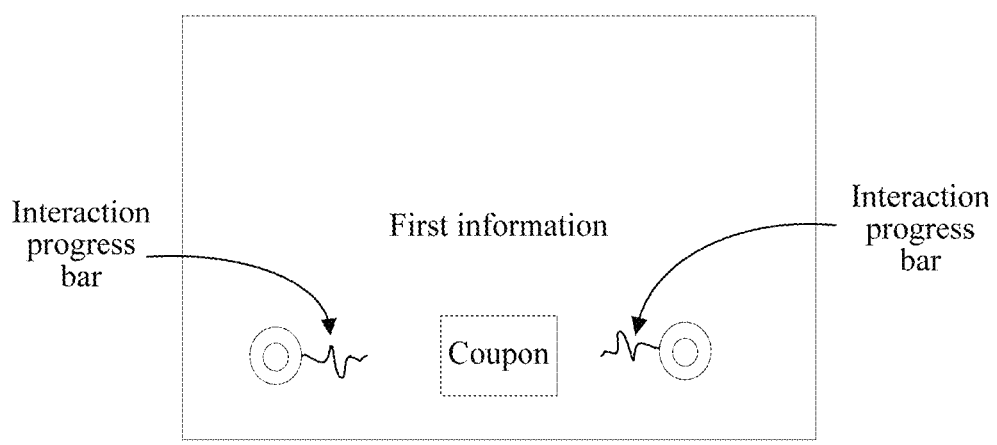
FIG. 10 is a schematic diagram of display effect of another terminal according to an embodiment of the present disclosure.
Figure 11:
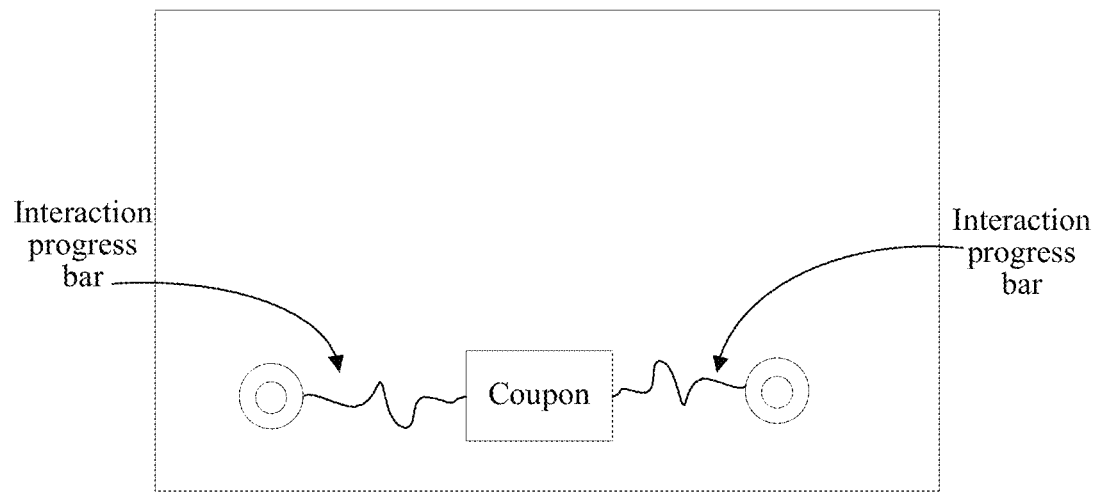
FIG. 11 is a schematic diagram of display effect of another terminal according to an embodiment of the present disclosure.

For example, FIG. 10 and FIG. 11 are schematic diagrams of changes of an interaction progress generated by that an interaction progress bar varies as the interactive operations detected by the first terminal and the second terminal. The first terminal and the second terminal detect that an operation time of the interactive operation keeps growing until a coupon displayed by the first terminal is touched. Once the coupon is touched, the interaction status may meet the preset interaction-completion condition, and a corresponding coupon may be obtained, thereby obtaining the collecting-information returned by the server. Obviously, the method displays an image of interaction progress, software and hardware resource utilization of the terminal is high, and the satisfaction degree of the user is high.

In step S160, the collecting-information for collecting the interaction benefit is sent when the interaction between the first terminal and the second terminal meets the preset interaction-completion condition. The collecting-information includes information indicating that an interaction benefit is successfully collected and/or operation information indicating that the interaction benefit is finally issued.

In step S170, the collecting-information may be displayed, facilitating collection of the user.

Obviously, according to the information processing method provided in one embodiment, when the first information is displayed, by displaying the interactive prompt, obtaining the operation information of the interactive operation, and collecting the benefit through interaction, on one hand, boring display of the first information is avoided, so as to make the display interesting, thereby improving user experience; and on the other hand, by giving out the interaction benefit, the user becomes more active to pay attention to the first information, effective propagation rates such as a clicking rate and a reading rate of the first information are improved, thereby improving an information conversion rate.

Figure 2:
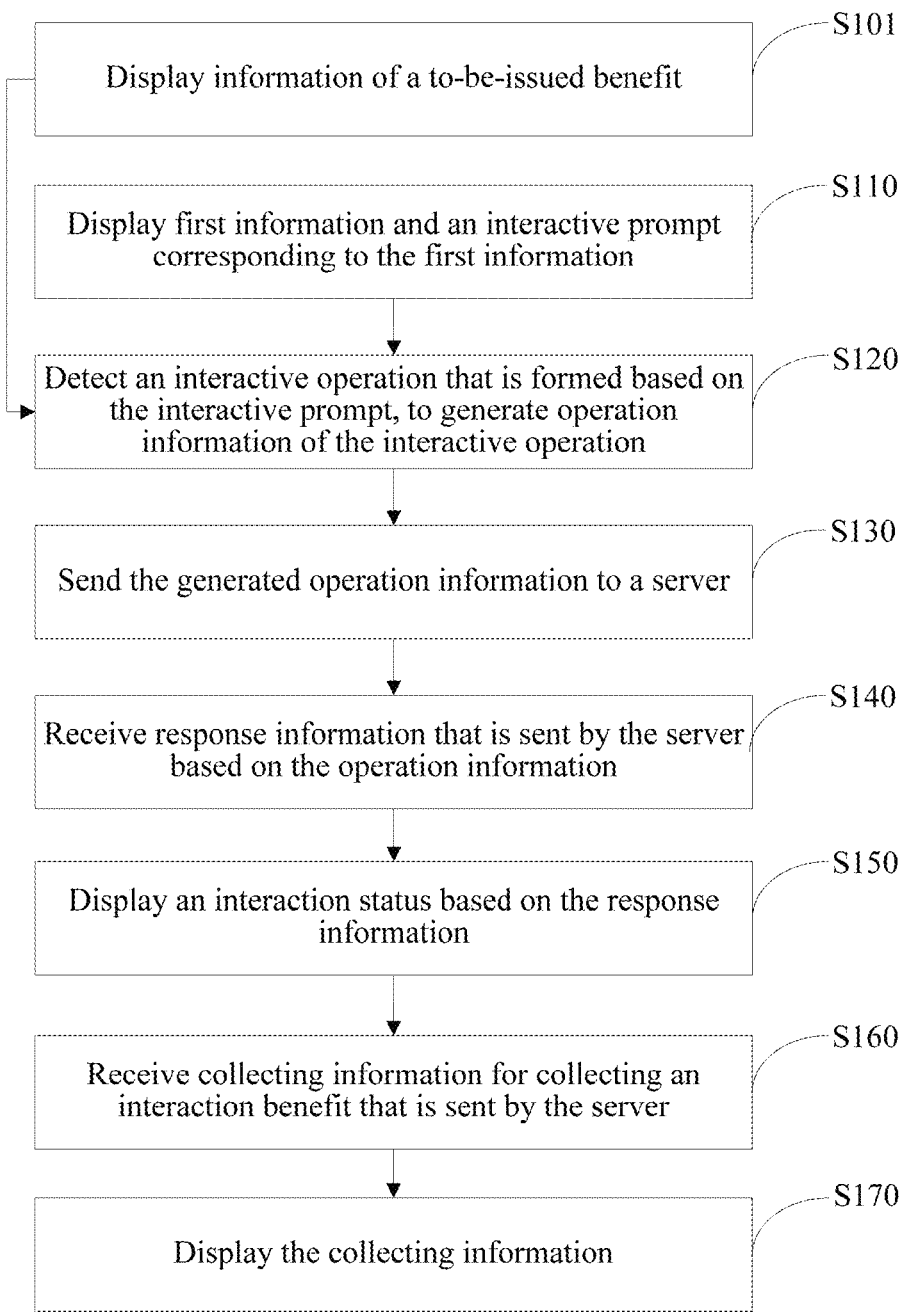
FIG. 2 is a schematic flowchart of another information processing method according to an embodiment of the present disclosure.

As shown in FIG. 2, the method further includes the followings.

Step S101: Displaying information of a to-be-issued benefit, where the interactive prompt is an operation prompt for obtaining the to-be-issued benefit.

The information of the to-be-issued benefit indicates, for example, text and/or picture information of content of the benefit. The to-be-issued benefit shown in FIG. 6 may include a coupon, advertisement skipping, various member qualifications, and the like. The coupon may be a coupon for purchasing an article or a service. The advertisement skipping may be a right of skipping viewing an advertisement that is prior to a video. The member qualification may be a member qualification of a video website or an application. Usually, the member qualification may be various member welfare.

In one embodiment, the interactive prompt may provide the user with prompt information of collecting the coupon, the member qualification, and/or the advertisement skipping through the interactive operation.

In some embodiments, there may be only one to-be-issued benefit or a plurality of to-be-issued benefits. For example, step S101 may include: displaying information of N number of to-be-issued benefits, where N is an integer not smaller than 2; and detecting a selection operation of selecting M number of the to-be-issued benefits, where M is an integer smaller than N.

Step S160 may include: receiving collecting-information of M number of the to-be-issued benefits sent by the server.

In one embodiment, the first terminal may display N number of to-be-issued benefits. The N number of to-be-issued benefits may be the same with or different from each other. In one embodiment, the N number of to-be-issued benefits, for example, are to-be-issued benefits of different types or different N number of to-be-issued benefits of a same type. The user may select one or more from the N number of to-be-issued benefits.

Figure 5:
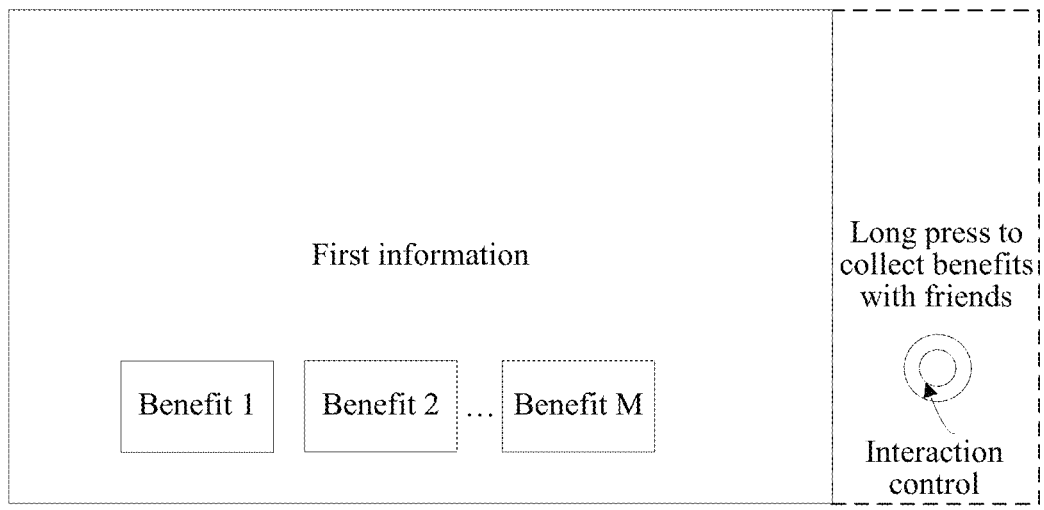
FIG. 5 is a schematic diagram of display effect of another terminal according to an embodiment of the present disclosure.
Figure 6:
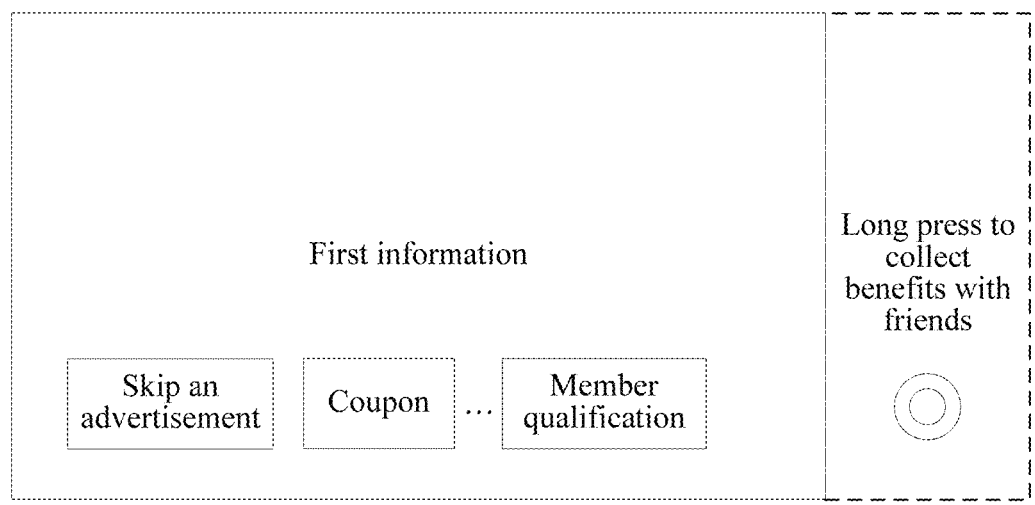
FIG. 6 is a schematic diagram of display effect of another terminal according to an embodiment of the present disclosure.

As shown in FIG. 5 and FIG. 6, the first terminal may simultaneously display M benefits that are respectively benefit 1, benefit 2, . . . , and benefit M. The interaction control in FIG. 3 and FIG. 5 is different from a display region of the first information. The interaction control is located outside the display region of the first information, and the interactive prompt may be placed close to the interaction control. In FIG. 5 and FIG. 6, the interactive prompt is "long pressing to collect benefits with friends". Herein, the "long pressing" in the interactive prompt may be a user operation acted on a touchscreen of the first terminal by a user finger or by using a touch pen, where a duration of the user operation reaches a specified duration. The first terminal includes a touchscreen. The touchscreen may detect an operation of the user finger or the touch pen. If the user finger or the touch pen acts on a position for a long enough time period, the operation is considered to be a long press operation, it may be considered that the first terminal detects the long press operation, and it is considered that the user of the first terminal participates in an operation of collecting the interaction benefit.

A plurality of benefits are shown in FIG. 5 and FIG. 6. On this basis, the first terminal further includes a selection operation of detecting a benefit selected by the user, to send selection information of the benefit that is expected to be obtained by the user to the server, so as to help the server to issue the benefit in a targeted manner.

For example, the first terminal displays information of four different to-be-issued benefits. The first terminal selects one or two or three of the to-be-issued benefits by detecting the selection operation, and forms a to-be-issued benefit combination that is based on the user operation. The to-be-issued benefit combination may be a set including one or more to-be-issued benefits that is formed under an operation such as clicking, sliding, or a voice instruction of the user.

To notify the server of the M number of to-be-issued benefits selected by the user, the first terminal may further send the selection information to the server. In this way, when issuing the benefit, the server needs to select to send which M number of to-be-issued benefits in the N number of to-be-issued benefits. Correspondingly, the collecting-information sent by the server is received in step S160. The collecting-information is collecting-information of the M selected to-be-issued benefits.

In a specific application, the interactive operation matches the M selected to-be-issued benefits. For example, the N number of to-be-issued benefits may include a coupon, advertisement skipping, and a member qualification. If the first terminal detects the selection operation, one or more of the N number of to-be-issued benefits may be selected, according to the selection operation, to serve as the to-be-issued benefit selected by the user. In this case, the interactive prompt information may be used to prompt that the to-be-issued benefit is expected to be obtained and the interactive operation needs to be performed. The user may perform the interactive operation according to the interactive prompt information.

For example, the first terminal selects a coupon according to the selection operation entered by the user. The interactive operation corresponding to the coupon is that the user clicks a displayed interaction button, and another user may be paired. In a preset duration after being paired, the user continuously clicks the interaction button, until the interaction is completed, and the server sends the coupon into an account corresponding to the user. Obviously, while the first information is displayed, the user may obtain the to-be-issued benefit according to the interactive operation. On one hand, problems of boring information display caused by only separately displaying the first information, and an uninteresting display form of the first information are avoided; and on the other hand, by using the to-be-issued benefit as a reward of the interactive operation, the user is motivated to obtain the interaction benefit through the interactive operation when the first information is displayed. In this way, phenomena that a propagation rate of the first information is low and effective utilization of a display resource of the first information is low due to that the user does not look at the display of the first terminal and the user does not watch the first information when the first information is displayed are avoided.

In some embodiments, step S101 may include: at least displaying the information of the to-be-issued benefit in a partial overlapping manner on a display region of the first information, where a display area of an overlapping display part is smaller than a display area of the first information.

For example, the display region for displaying the first information is a region A. In one embodiment, the information of the to-be-issued benefit may also be displayed in the region A, and the information of the to-be-issued benefit is displayed on the first information in an overlapping manner. Certainly, a part of the information of the to-be-issued benefit may be displayed covering the region A, and another part is displayed in a region B other than the region A. In one embodiment, usually a display area of the information of the to-be-issued benefit is smaller than the display area of the first information, and at least the display area of the overlapping display part is smaller than the display area of the first information. In this way, the information of the to-be-issued benefit may be prevented from completely covering the first information.

Figure 7:
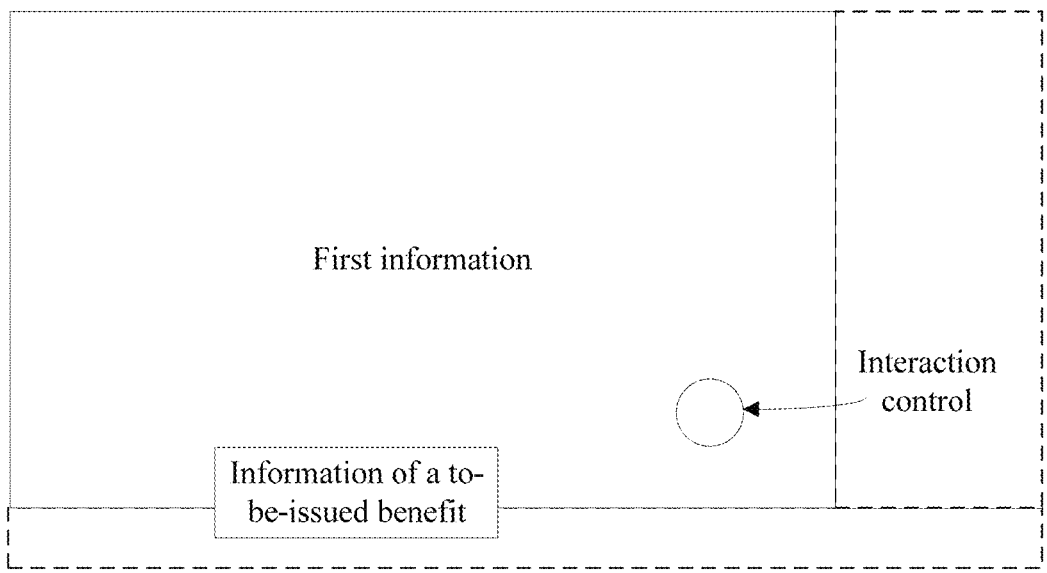
FIG. 7 is a schematic diagram of display effect of another terminal according to an embodiment of the present disclosure.

In FIG. 3 to FIG. 6, all the information of the to-be-issued benefit is displayed on the first information in an overlapping manner. In FIG. 7, the information of the to-be-issued benefit is merely partially displayed on the first information in an overlapping manner, and a part is displayed in a region other than the display region of the first information.

In one embodiment, the second terminal is a terminal when the first terminal meets a preset matching condition. The first terminal may be a terminal that performs the information processing method in one embodiment. The terminal may be a mobile phone, a tablet computer, or an electronic device.

In some embodiments, the operation information may include the start time of the interactive operation. The start time is used for the server to determine whether the first terminal and the second terminal meet the preset matching condition.

The server is connected to a plurality of terminals, and the first terminal and the second terminal are any two different terminals in the plurality of terminals. The terminal detects the interactive operation, for example, detects the start time of the interactive operation, and sends the start time that serves as the operation information to the server. After receiving the start time, the server matches two terminals closest to the start time to serve as the first terminal and the second terminal, or uses two terminals whose start times are within a threshold range of a preset duration as the first terminal and the second terminal.

In one embodiment, the first terminal and the second terminal that meet the preset matching condition are selected based on the operation information sent by each terminal, so that the difference between the start time detected by the selected first terminal and the start time detected by the selected second terminal detect is not excessively large. Otherwise, after a user performs the interactive operation, the preset interaction-completion condition may not be met for a long time due to an inappropriate selection of the second terminal. In this way, interaction effect is improved.

In some embodiments, the operation information includes the start time, a suspension time, a recovery time, and an end time of the interactive operation. The start time is a time when the interactive operation is started to be performed, and the suspension time is a time when the interactive operation is temporarily suspended. The recovery time is a time when the interactive operation is recovered to be performed after being temporarily suspended, and the end time is a time when the interactive operation ends. For example, the user clicks the interaction control, releases the interaction control in the halfway for two seconds, and subsequently continues to click the interaction control. Herein, temporary suspension of the interactive operation means that it is detected that a time interval between two interactive operations is smaller than a preset time interval. For example, if the time interval is three seconds, two interactive operations whose time interval is three seconds may be considered as one interactive operation having a time interval of three seconds.

The start time, the recovery time, the suspension time, and the end time are used for the server to determine the action duration. The action duration is used for the server to determine whether the interaction status meets the preset interaction-completion condition.

For example, if the preset interaction-completion condition is met, the first terminal and the second terminal respectively detect that the action time of the interactive operation is a predetermined time length after being determined to be matching. In this way, the start time, the recovery time, the suspension time, and the end time may be used to calculate the length of the action time of the interactive operation that is detected by the terminal. In one embodiment, the interaction status may include an interaction duration, a total action duration, and the like.

In view of the above, according to the information processing method in one embodiment, when the first information is displayed, boring display of the first information and a low propagation rate of the first information can be avoided through detections of the interactive prompt information and the interactive operation.

Figure 8:
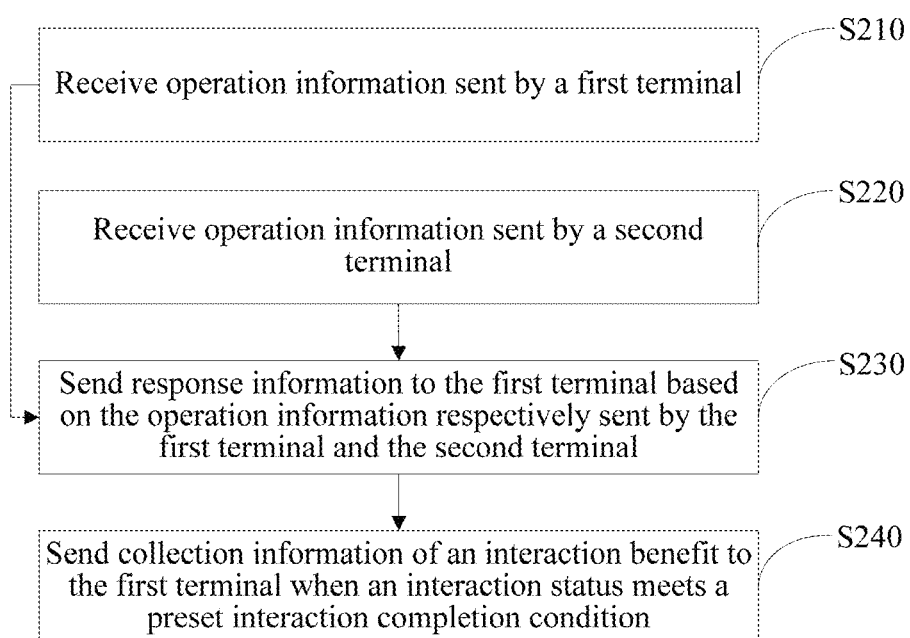
FIG. 8 is a schematic flowchart of another information processing method according to an embodiment of the present disclosure.

As shown in FIG. 8, one embodiment provides another information processing method for a server. The method may include the followings.

Step S210: Receiving operation information sent by a first terminal, the operation information sent by the first terminal being generated by the first terminal by detecting an interactive operation when displaying first information and an interactive prompt.

Step S220: Receiving operation information sent by a second terminal, the operation information sent by the second terminal being generated by the first terminal by detecting an interactive operation when displaying the first information and the interactive prompt.

Step S230: Sending response information to the first terminal based on the operation information respectively sent by the first terminal and the second terminal, the response information being used for the first terminal to display an interaction status.

Step S240: Sending information for collecting an interaction benefit to the first terminal when the interaction status meets a preset interaction-completion condition.

In one embodiment, step S210 and step S220 may be performed at the same time, or may be performed in a sequential order. In view of the above, the server in one embodiment may receive operation information of a plurality of terminals, and may send the response information to a corresponding terminal after receiving the response information of each terminal, so that the terminal displays the interaction status according to the response information, for example, helping the first terminal to display an interaction progress. Finally, the server sends the collecting-information for collecting the interaction benefit to two terminals that interact with each other when the two terminals meet the preset interaction-completion condition, to notify the corresponding terminal to collect the interaction benefit.

In a specific implementation process, the method in one embodiment may further include sending display data of the first information and the interactive prompt to the terminal. In this way, after receiving the display data, the terminal displays the first information and the interactive prompt, thereby helping a user to perform the corresponding interactive operation after seeing the first information and the interactive prompt at the terminal, alleviating boring display of the first information, and improving an effective propagation rate of the first information and effective utilization of a display resource displaying the first information.

In some embodiments, the method further includes step S201: Judging whether the first terminal and the second terminal meet a preset matching condition. Step S230 may include sending, when the first terminal and the second terminal meet the preset matching condition, the response information to the first terminal based on the operation information respectively sent by the first terminal and the second terminal.

In one embodiment, whether the first terminal and the second terminal meet the preset matching condition needs to be judged first, and step S230 is performed only when the first terminal and the second terminal meet the preset matching condition. That is, the first terminal and the second terminal are terminals that are selected by the server and that meet the preset matching condition.

There may be a plurality of optional methods for judging whether the first terminal and the second terminal are terminals meeting the preset matching condition. Several optional methods are provided below.

Optional Method 1

Provided that a sending time when the first terminal sends the operation information is a first sending time, and a time when the second terminal sends the operation information is a second sending time, step S201 includes: judging whether the first sending time and the second sending time have a minimum time interval among sending time from all operation information received by the server; and if yes, determining that the first terminal and the second terminal meet the preset matching condition.

Optional Method 2

Provided a sending time when the first terminal sends the operation information is a first sending time, and a time when the second terminal sends the operation information is a second sending time, step S201 includes: judging whether a time interval between the first sending time and the second sending time is within a first preset time range; and if yes, determining that the first terminal and the second terminal meet the preset matching condition.

Optional Method 3

The operation information generated by the first terminal includes a first start time when the first terminal detects the interactive operation; the operation information generated by the second terminal includes a second start time when the second terminal detects the interactive operation; and step S201 may include: judging whether the first start time and the second start time are two closest start time among all start time received by the server; and if yes, determining that the first terminal and the second terminal meet the preset matching condition.

Optional Method 4

The operation information generated by the first terminal includes a first start time when the first terminal detects the interactive operation; the operation information generated by the second terminal includes a second start time when the second terminal detects the interactive operation; and step S201 may include: judging whether a time interval between the first start time and the second start time is within a second preset range; and if yes, determining that the first terminal and the second terminal meet the preset matching condition.

Four methods for judging whether the first terminal and the second terminal meet the preset matching condition are provided above as examples of specific implementation, it is not limited to four or any one of the foregoing methods.

Figure 9:
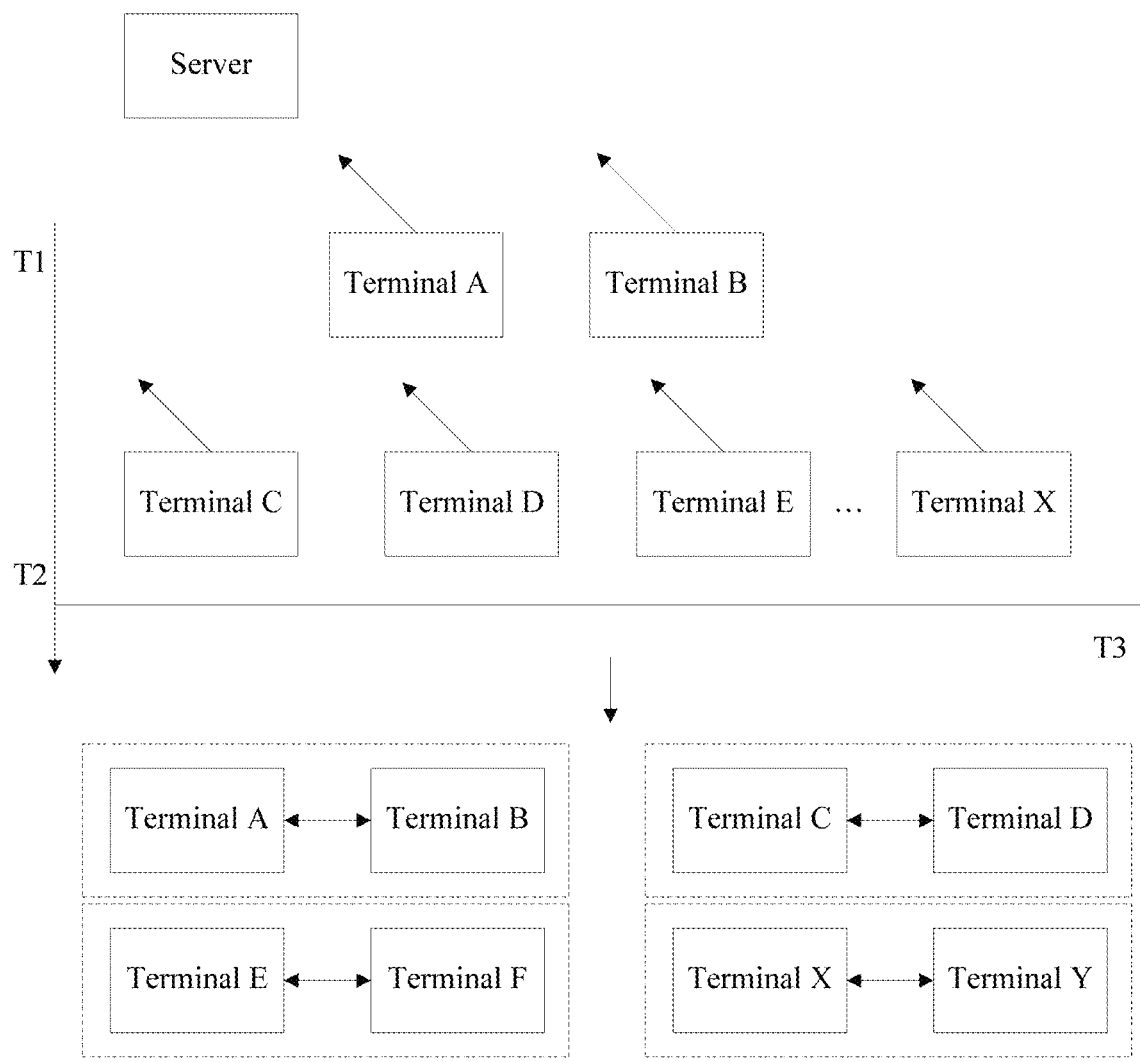
FIG. 9 is a schematic diagram of selecting a terminal meeting a preset matching condition according to an embodiment of the present disclosure.

As shown in FIG. 9, some embodiments of the present disclosure provide a method of selecting a first terminal and a second terminal that meet the preset matching condition based on a start time when the terminal sends the operation information. Two time axes are shown in FIG. 9. In a longitudinal time-axis, T1 is earlier than T2; and in a horizontal time-axis, T3 is later than T2. A terminal A, a terminal B, a terminal C, a terminal D, a terminal E, to a terminal X respectively send operation information to the server. In FIG. 9, a sorting order of the terminals on the time-axis corresponds to start time when the terminals detect an interactive operation. If the server selects two terminals whose start time are spaced from each other to serve as a terminal set that meets the preset matching condition, the allocated terminal set is shown in the lower part of FIG. 9. The terminal A and the terminal B form a terminal set that meets the preset matching condition; the terminal C and the terminal D form a terminal set that meets the preset matching condition; the terminal E and the terminal F form a terminal set that meets the preset matching condition; and the terminal X and a terminal Y form a terminal set that meets the preset matching condition.

In some embodiments, the method further includes: determining, according to the operation information generated by the first terminal and the operation information generated by the second terminal, a first action duration of the interactive operation detected by the first terminal and a second action duration of the interactive operation detected by the second terminal; and determining, according to the first action duration and the second action duration, whether the interaction status meets the preset interaction-completion condition.

For example, the determining, according to the first action duration and the second action duration, whether the interaction status meets the preset interaction-completion condition includes: determining, when the first action duration and the second action duration both reach a preset duration, that the interaction status meets the preset interaction-completion condition.

For another example, the determining, according to the first action duration and the second action duration, whether the interaction status meets the preset interaction-completion condition includes: determining, when a total duration of the first action duration and the second action duration reaches a preset duration, that the interaction status meets the preset interaction-completion condition.

For example, in some embodiments, the operation information generated by the first terminal and the operation information generated by the second terminal both include a start time and a suspension time, a recovery time, and an end time of the interactive operation. The start time, the suspension time, the recovery time, and the end time may be used for the server to calculate the first action duration and/or the second action duration. Certainly, in a specific implementation process, the operation information may directly include the first action duration of the interactive operation detected by the first terminal and the second action duration of the interactive operation detected by the second terminal.

An interaction progress bar is shown in both FIG. 10 and FIG. 11. The interaction progress is used to indicate an interaction time. In FIG. 10 and FIG. 11, the interaction progress bar moves in a direction from an interaction control to a coupon. The coupon herein may be information of a to-be-issued benefit. In one embodiment, if interaction progress bars at both sides touch the coupon, it indicates that a first action duration and the second action duration of the interactive operations detected by the first terminal and the second terminal reach a preset duration, meeting an interaction-completion condition. In this case, final presentation effect of the interaction progress bar is shown in FIG. 10. In one embodiment, through display of the interaction status such as the interaction progress, to help the user to view a current interaction progress, the interaction time further needs to be continued. Therefore, intelligence of the terminal is improved and, in addition, satisfaction degree of the user is improved.

Certainly, in a specific implementation process, the operation information may include number of times that the first terminal and the second terminal respectively detect the interactive operation; and determining that the interaction status meets the preset interaction-completion condition may further include whether the number of times that the first terminal and the second terminal detect the interactive operation reach a preset quantity of times, or a total number of times that the first terminal and the second terminal detect the interactive operation reaches the preset quantity of times.

In view of the above, there are multiple manners to determine that the interaction status meets the preset interaction-completion condition, not being limited to the several ones described herein.

The response information sent to the first terminal in step S230 may include various information content, and two implementation manners are provided below.

Implementation Manner 1

Step S230 may include: sending the operation information generated by the second terminal to the first terminal.

Implementation Manner 2

Step S230 may include: generating interaction status information respectively according to the operation information provided by the first terminal and the second terminal; and sending the interaction status information to the first terminal.

Obviously, in the first manner, the server directly feeds the operation information provided by the second terminal back to the first terminal. In this way, obtaining of the interaction status is determined by the first terminal in combination with the operation information of the first terminal. Therefore, load of the server may be reduced.

In the second manner, the server may obtain the interaction status information according to the operation information respectively obtained from the first terminal and the second terminal, helping the first terminal to directly display the interaction status according to the interaction status information. The interaction status may include an interaction progress.

In view of the above, the response information provided for the terminal by the server in one embodiment may be various types of information, for example, operation information fed back by another terminal, or interaction status information generated based on the operation information.

Figure 12:
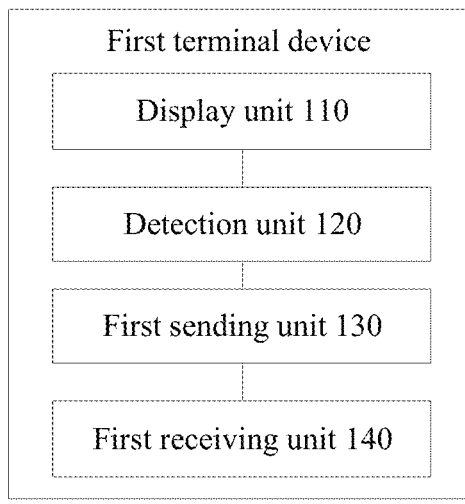
FIG. 12 is a schematic structural diagram of a terminal device according to an embodiment of the present disclosure.

As shown in FIG. 12, an embodiment of the present disclosure further provides a terminal. The terminal is a first terminal, and includes: a display unit 110, a detection unit 120, a first sending unit 130, and a first receiving unit 140.

The display unit 110 is configured to display first information and an interactive prompt corresponding to the first information. The display unit 110 provided in one embodiment may correspond to various displays, such as a liquid crystal display, a projection display, an electronic ink display, or an organic light emitting diode (OLED) display. These displays may be configured to display various information, for example, the first information and interactive prompt information.

The detection unit 120 is configured to detect an interactive operation that is formed based on the interactive prompt, to generate operation information of the interactive operation. The detection unit 120 may correspond to various human-computer interaction interfaces that can detect a user operation, for example, a touch panel disposed together with a display, a touch panel disposed to be separated from a display, a mouse, a keyboard, or a voice collection and identification structure. That is, the detection unit 120 may be various human-computer interaction interfaces that can detect the interactive operation, facilitating user operations and actions, and achieving input of the interactive operation.

The first sending unit 130 is configured to send the generated operation information to a server. The first receiving unit 140 is configured to receive response information sent by the server based on the operation information, the response information being generated based on the operation information that is detected and generated by a second terminal, and the operation information of the second terminal being generated based on the interactive prompt. The first sending unit 130 and the first receiving unit 140 may correspond to a communications interface. The communications interface may be configured to exchange various information with the server, for example, send operation information generated by the first terminal, and obtain operation information of the second terminal.

The display unit 110 is further configured to display an interaction status based on the response information. The first receiving unit 140 is further configured to receive information for collecting an interaction benefit sent by the server, the collecting-information being sent when the server detects that the interaction status meets a preset interaction-completion condition. The display unit 110 is further configured to display the collecting-information.

The first terminal provided in one embodiment, through interaction with the server, may achieve interaction with different terminals when displaying the first information; and may issue a benefit through interaction, to improve positivity of user participation. In addition, a problem that display of the first information does not reach expected effect because the user pays attention to a region other than a displayed range when the first terminal displays the first information is avoided.

In some embodiments, the display unit 110 is further configured to display information of a to-be-issued benefit, where the interactive prompt is an operation prompt for obtaining the to-be-issued benefit. In one embodiment, the display unit 110 is configured to display the interactive prompt, and may further display information of a to-be-issued benefit, helping the user to compare and view, so as to prompt the user to perform the interactive operation. Usually, the display unit 110 displays the information of the to-be-issued benefit and interaction commissioning on a same display interface.

Specifically, for example, the display unit 110 may further be configured to display information of N number of to-be-issued benefits, where N is an integer not smaller than 2; the detection unit 120 is further be configured to detect a selection operation for selecting M number of the to-be-issued benefits, where M is an integer smaller than N; and the first receiving unit 140 may further be configured to receive collecting-information of M number of the to-be-issued benefits sent by the server.

In one embodiment, the display unit 110 may display the information of M number of to-be-issued benefits, helping the user to select. The detection unit 120 may further be configured to detect the selection operation. The first sending unit 130 may notify the server of the M selected to-be-issued benefits. Therefore, the first receiving unit 140 receives collecting-information of the M number of to-be-issued benefits. In this way, the user selects the needed to-be-issued benefit and performs the corresponding interactive operation.

In some embodiments, the display unit 110 is configured to at least display the information of the to-be-issued benefit in a partial overlapping manner on a display region of the first information, where a display area of an overlapping display part is smaller than a display area of the first information. In one embodiment, the information of the to-be-issued benefit is displayed at least partially overlapping the first information. In a specific implementation process, the display unit 110 may also display the information of the to-be-issued benefit without overlapping, for example, may display the information of the to-be-issued benefit in a region close to the display region of the first information.

In one embodiment, the first terminal and the second terminal may be two terminals having no association relationship, for example, may be two devices that are randomly selected by the server and that both send operation information to the server. However, in one embodiment, the second terminal is a terminal when the first terminal meets a preset matching condition. For example, the operation information includes a start time of the interactive operation. The start time is used for the server to determine whether the first terminal and the second terminal meet the preset matching condition.

In this way, in some embodiments, the operation information includes the start time, a suspension time, a recovery time, and an end time of the interactive operation. The start time, the recovery time, the suspension time, and the end time are used for the server to determine an action duration. The action duration is used for the server to determine whether the interaction status meets the preset interaction-completion condition.

The response information may directly include the operation information provided by the second terminal, or may directly include interaction status information generated by the server.

For example, the first receiving unit 140 is configured to receive the operation information sent by the server and that is detected and generated by the second terminal. The display unit 110 is configured to display the interaction status based on the operation information generated by the first terminal and the operation information generated by the second terminal. In this way, usually the first terminal further includes a processor. The processor may include information processing structures having information processing functions, such as a central processing unit, a digital signal processor, a microprocessor, an application processor, or a programmable array, or a processing circuit such as an ASIC. For example, the processor may perform, through execution of predetermined code, predetermined processing on the operation information that is respectively generated by the first terminal and the second terminal, to obtain the interaction status information, and control the display unit 110 to display the interaction status based on the interaction status information. The interaction status herein may be displayed with an image or may be displayed with a text. Displaying with an image may include an interaction progress bar, and displaying with a text may include a completion percentage indicating the interaction progress.

In another embodiment, the first receiving unit 140 is configured to receive the interaction status information sent by the server, where the interaction status information is generated by the server according to the operation information respectively provided by the first terminal and the second terminal; and the display unit 110 is specifically configured to display the interaction status based on the interaction status information. In one embodiment, the interaction status information is generated by the server, and is directly received by the first receiving unit 140 from the server. The display unit 110 directly displays the interaction status according to the interaction status information received from the server.

Accordingly, the first terminal provided in one embodiment, when displaying the first information, may display the interactive prompt and detect the interactive operation that is entered by the user based on the interactive prompt, to obtain the operation information. Consequently, boring display of the first information is avoided, and an effective propagation rate of the first information and effective utilization of a display resource displaying the first information are improved.

Figure 13:
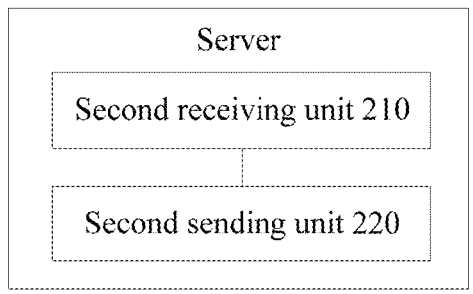
FIG. 13 is a schematic structural diagram of a server according to an embodiment of the present disclosure.

As shown in FIG. 13, an embodiment provides a server, and the server includes a second receiving unit 210 and a second sending unit 220.

The second receiving unit 210 is configured to receive operation information sent by a first terminal, the operation information sent by the first terminal being generated by the first terminal by detecting an interactive operation when displaying first information and an interactive prompt; and receive operation information sent by a second terminal, the operation information sent by the second terminal being generated by the first terminal by detecting an interactive operation when displaying the first information and the interactive prompt.

The second sending unit 220 is configured to send response information to the first terminal based on the operation information respectively sent by the first terminal and the second terminal, the response information being used for the first terminal to display an interaction status; and send information for collecting an interaction benefit to the first terminal when the interaction status meets a preset interaction-completion condition.

The server provided in one embodiment may be a network side device that can exchange information with the first terminal and the second terminal, for example, may be one or more electronic devices located at a network side.

The second receiving unit 210 and the second sending unit 220 may correspond to a communications interface. The communications interface may be a wireless interface or a wired interface. The wired interface herein may be a cable interface or an optical cable interface. The wireless interface herein may be various antennas having transceiver functions, for example, a WiFi antenna.

Accordingly, the server in one embodiment may exchange information with the first terminal and the second terminal, and may assist the terminal in obtaining, when displaying the first information, a to-be-issued benefit by using the interactive operation. On one hand, interaction between users may be promoted through issuing of a benefit. In addition, due to execution of the interactive operation, phenomena that an effective propagation rate of the first information is lowered and effective utilization of a display resource is low because sight line is moved out from a display region of the first information when the terminal displays the first information may be reduced.

In some embodiments, the server further includes: a judgment unit, configured to judge whether the first terminal and the second terminal meet a preset matching condition. The second sending unit 220 is specifically configured to send, when the first terminal and the second terminal meet the preset matching condition, the response information to the first terminal based on the operation information respectively sent by the first terminal and the second terminal.

The judgment unit in one embodiment may correspond to a processor or a processing circuit. The processor may include a central processing unit (CPU), a microprocessor (MPU), an application processor (AP), a digital signal processor (DSP), or a programmable array (PLC). The processing circuit may include an application-specific integrated circuit (ASIC). The processor or the processing circuit may judge, through execution of predetermined code, whether the first terminal and the second terminal meet the preset matching condition.

In one embodiment of the present disclosure, a phenomenon that an interaction-completion condition cannot be met for a long time because the first terminal and the second terminal do not meet a matching condition may be avoided due to meeting of the preset matching condition between the first terminal and the second terminal. Therefore, in one embodiment of the present disclosure, meeting of the matching condition between the first terminal and the second terminal may accelerate the interaction status to meet the interaction-completion condition.

In some embodiments, a sending time when the first terminal sends the operation information is a first sending time, and a time when the second terminal sends the operation information is a second sending time; the judgment unit is specifically configured to judge whether the first sending time and the second sending time have a minimum time interval among sending time of all operation information received by the server, and if yes, determine that the first terminal and the second terminal meet the preset matching condition; or the judgment unit is configured to judge whether the time interval between the first sending time and the second sending time is within a first preset time range, and if yes, determine that the first terminal and the second terminal meet the preset matching condition.

In some other embodiments, the operation information generated by the first terminal includes a first start time when the first terminal detects the interactive operation; the operation information generated by the second terminal includes a second start time when the second terminal detects the interactive operation; the judgment unit is further configured to judge whether the first start time and the second start time are two closest start time among all start time received by the server, and if yes, determine that the first terminal and the second terminal meet the preset matching condition; or the judgment unit is configured to judge whether a time interval between the first start time and the second start time is within a second preset range, and if yes, determine that the first terminal and the second terminal meet the preset matching condition.

Certainly, when the first terminal and the second terminal may be terminals randomly selected by the server, the interaction-completion condition may be accelerated to be met because the preset matching condition is met. In addition, the judgment unit that adjusts two terminals meeting the preset matching condition is not limited to the foregoing structure.

In some other embodiments, the server further includes: a determining unit, configured to determine, according to the operation information generated by the first terminal and the operation information generated by the second terminal, a first action duration of the interactive operation detected by the first terminal and a second action duration of the interactive operation detected by the second terminal; and determine, according to the first action duration and the second action duration, whether the interaction status meets the preset interaction-completion condition.

The determining unit herein may correspond to a processor or a processing circuit. A structure of the processor or the processing circuit may be same as or similar to that of the processor or the processing circuit corresponding to the judgment unit, and is not described herein again.

In some embodiments, the determining unit is configured to determine, when the first action duration and the second action duration both reach a preset duration, that the interaction status meets the preset interaction-completion condition. For example, the operation information generated by the first terminal and the operation information generated by the second terminal both include a start time and a suspension time, a recovery time, and an end time of the interactive operation. In view of the above, the foregoing time of the operation information herein may be used for the determining unit to determine the first action duration and the second action duration.

In some embodiments, the second sending unit 220 is configured to send the operation information generated by the second terminal to the first terminal. In one embodiment, the operation information of the second terminal is considered as the response information and is sent to the first terminal, so that the first terminal displays the interaction status in combination with the operation information of the first terminal.

In some other embodiments, the second sending unit 220 is configured to generate interaction status information respectively according to the operation information provided by the first terminal and the second terminal; and send the interaction status information to the first terminal. In one embodiment, the second sending unit 220 may include a processing module. The processing module may correspond to the foregoing processor or processing circuit; and may generate the interaction status information according to the operation information respectively provided by the first terminal and the second terminal, and directly send the interaction status information to the first terminal, so as to help the first terminal to directly display the interaction status according to the interaction status information.

An embodiment of the present disclosure provides a computer storage medium. The computer storage medium stores computer executable instructions, and the computer executable instructions, when executed by one or more processors, can be applied to the information processing method applied to a terminal that is provided in any one of the foregoing technical solutions, for example, including but not limited to the method shown in FIG. 1 and/or FIG. 2.

The computer storage medium may be various storage media such as a read-only storage medium, a random storage medium, a flash memory, or a removable hard disk, and is optionally a non-transitory storage medium.

An embodiment of the present disclosure further provides another terminal. The terminal includes a first communications interface, a first memory, and a first processor.

The first communications interface is configured to be connected to a server by using a network. The first memory is configured to store computer executable instructions. The first processor is respectively connected to the first communications interface and the first memory, and configured to implement, by executing the computer executable instructions, the foregoing information processing method performed by a first terminal.

The first communications interface herein may be a wired interface, for example, a twisted pair interface or an optical interface of a desktop computer. The first communications interface may further be a wireless interface, for example, a WiFi antenna connected to a network.

The first memory may be various types of memories, may include a non-transitory storage medium, and may store the computer executable instructions.

The first processor may be respectively connected to the first communications interface and the first memory by using a bus, including but not limited to a bus of an integrated circuit, so as to implement one or more of the information processing methods applied to the first terminal through information exchange between the first communications interface and the server.

An embodiment of the present disclosure further provides a server. The server includes a second communications interface, a second memory, and a second processor.

The second communications interface is configured to be connected to a terminal by using a network. The second memory is configured to store computer executable instructions. The second processor is respectively connected to the second communications interface and the second memory, and configured to implement, by executing the computer executable instructions, the foregoing information processing method performed by a server.

The second communications interface herein may be various external interfaces of the server that are configured to be connected to other devices, and may exchange various information in the information processing method with the terminal.

The second memory may be various types of memories, may include a non-transitory storage medium, and may store the computer executable instructions.

The second processor may be respectively connected to the second communications interface and the second memory by using a bus in the terminal, including but not limited to a bus of an integrated circuit, so as to implement one or more of the information processing methods applied to the server through information exchange between the second communications interface and the terminal.

Further, according to the disclosed embodiments, several specific examples are provided below for illustrative purposes.

Example 1

Figure 14:
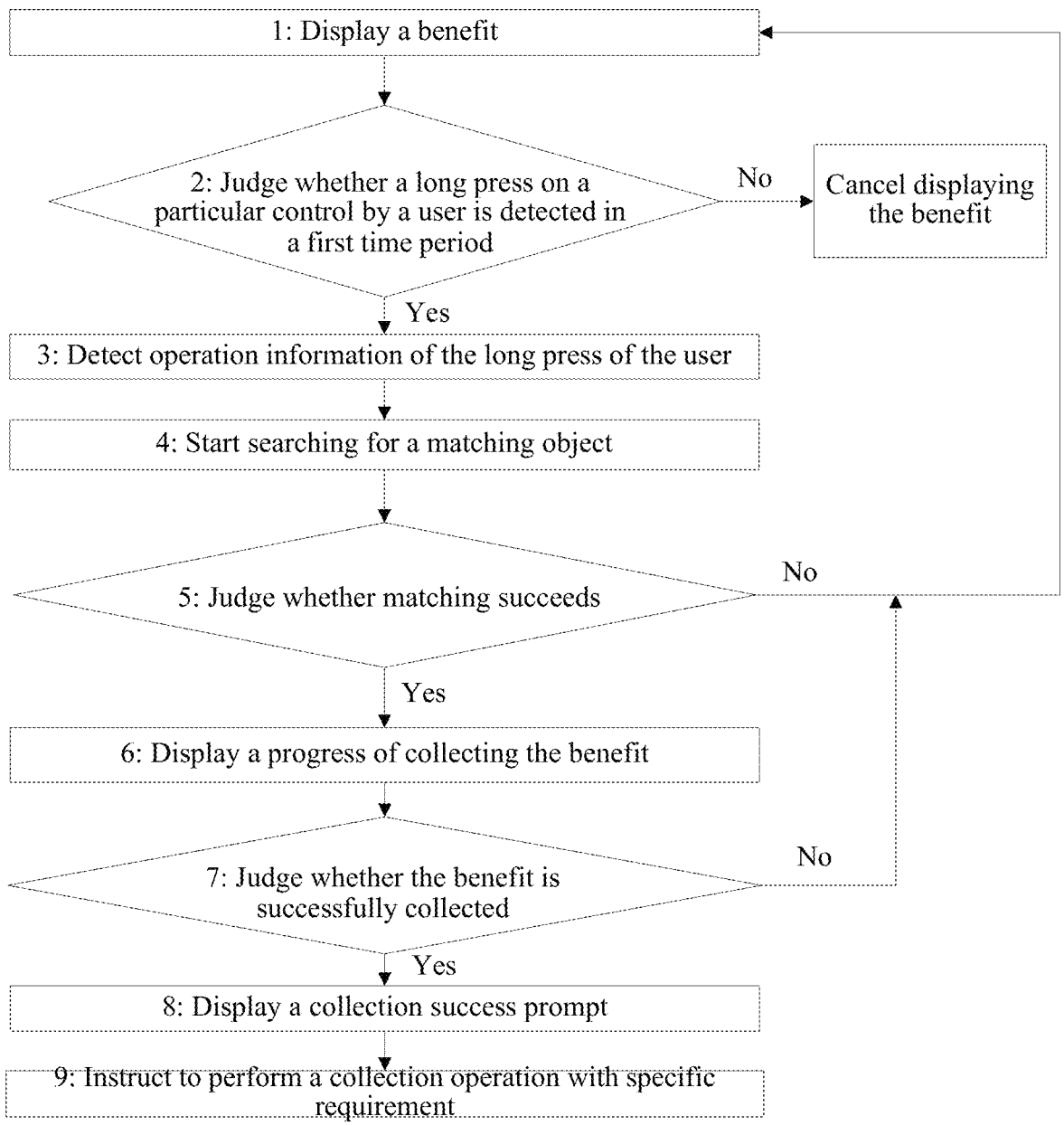
FIG. 14 is a schematic flowchart of another information processing method according to an embodiment of the present disclosure.

As shown in FIG. 14, this example provides an information processing method, including the followings.

Step 1: Displaying a benefit. The benefit may include a voucher, a coupon, bonus points, a member benefit, a member level, or rights beneficial to a user such as a privilege of watching promotion information without advertisements;

Step 2: Judging whether a long press on a particular control by the user is detected within a first time period, if yes, entering step 3, and if no, canceling the displaying of the benefit. The particular control may be a physical button or a displayed virtual control on a smartphone, a tablet computer, or a wearable device.

Step 3: Detecting operation information of the long press of the user. The operation information herein may include operation parameters of an interactive operation performed and entered by the user, such as a quantity of times of clicking, a pressing duration, and a sliding direction.

Step 4: Starting to search for a matching object. The matching object herein is an account of another user who also long presses the particular control.

Step 5: Judging whether matching succeeds, if yes, entering step 6, and if no, returning to step 1. Whether matching succeeds indicates whether a matching object is found.

Step 6: Displaying a progress of collecting the benefit. The progress may be the foregoing interaction progress, corresponding to an interaction status.

Step 7: Judging whether the benefit is successfully collected, if yes, entering step 8, and if no, returning to step 1.

Step 8: Displaying a collection success prompt.

Step 9: Prompting to perform a collection operation with specified requirements.

Example 2

Figure 15:
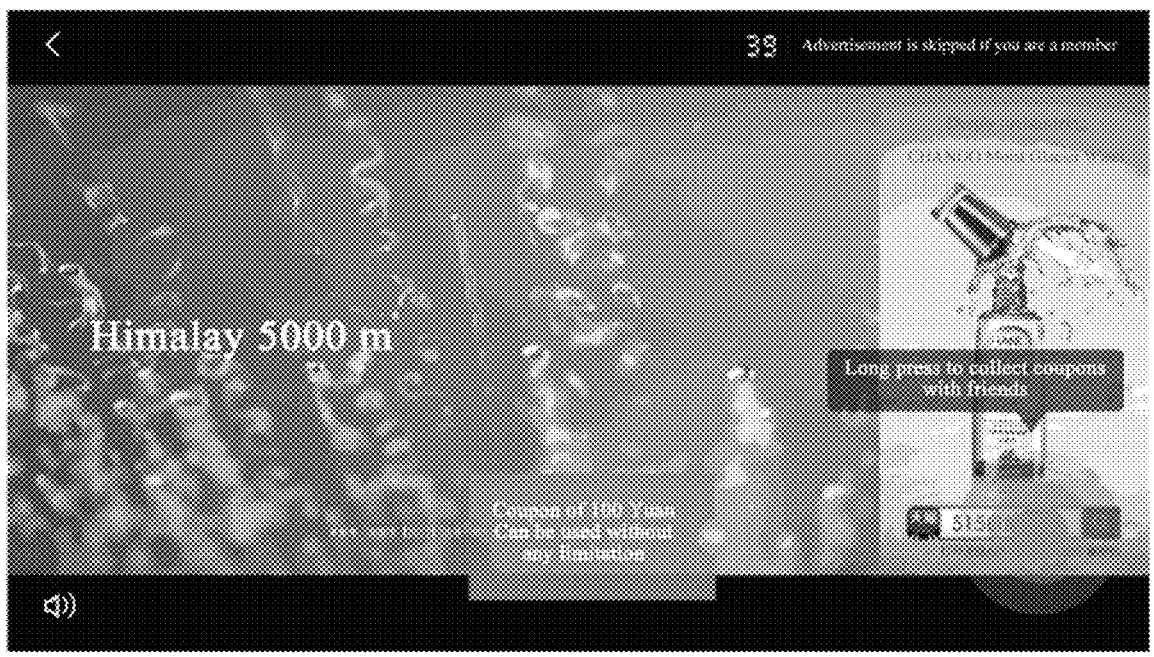
FIG. 15 is a schematic diagram of display effect that a terminal implements an information processing method according to an embodiment.

As shown in FIG. 15, a terminal A displays a coupon, an interaction control, and an interactive prompt when playing an advertisement of a skin care product. The terminal A herein may be a smart television, a mobile phone, or a tablet computer. The played advertisement may be played with content such as a television program or a video.

Figure 16:
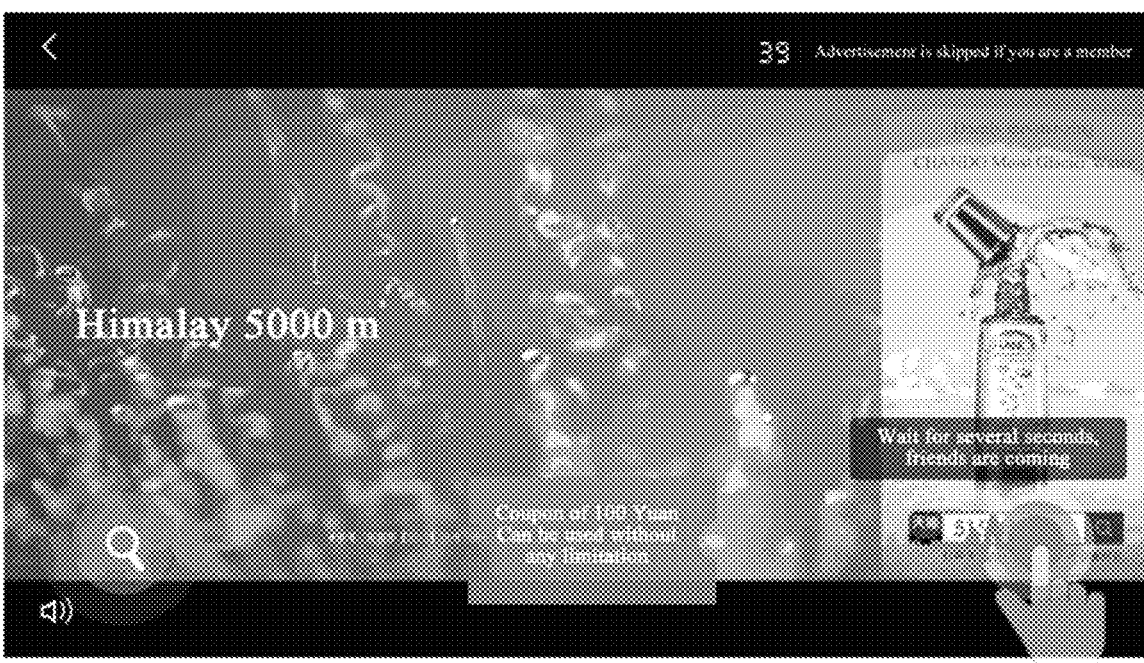
FIG. 16 is another schematic diagram of display effect that a terminal implements an information processing method according to an embodiment.

As shown in FIG. 16, the terminal A detects an interactive operation of long press of the user.

Figure 17:
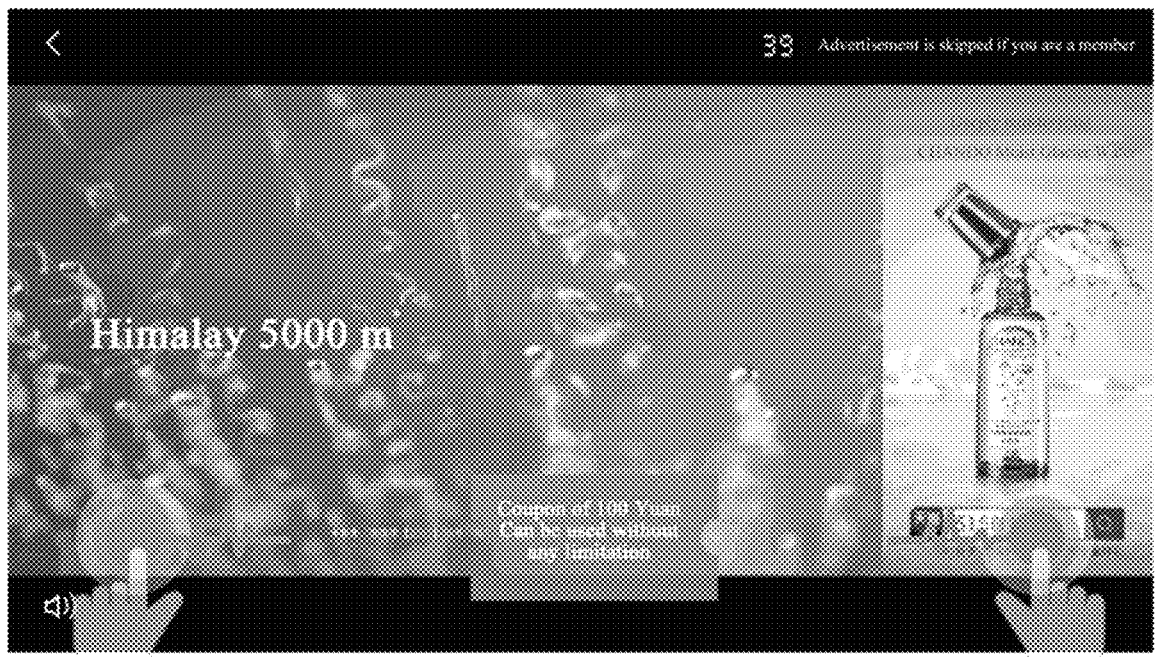
FIG. 17 is another schematic diagram of display effect that a terminal implements an information processing method according to an embodiment.

As shown in FIG. 17, after the terminal A sends the operation information of the interactive operation to the server, the server selects a terminal B that meets a preset matching condition together with the terminal A to form a terminal set, and sends response information to the terminal A. In this case, on interaction controls at two sides of the coupon, the terminal A indicates that the terminal B matching the terminal A is found through displaying a gesture pattern. The terminal A starts to display an interaction progress bar, so as to display the interaction status. The terminal B may also be a smart television, a mobile phone, or a tablet computer. A played advertisement may be played with content such as a television program or a video. The terminal B and the terminal A may be a same type of terminals, or may be different types of terminals.

Figure 18:
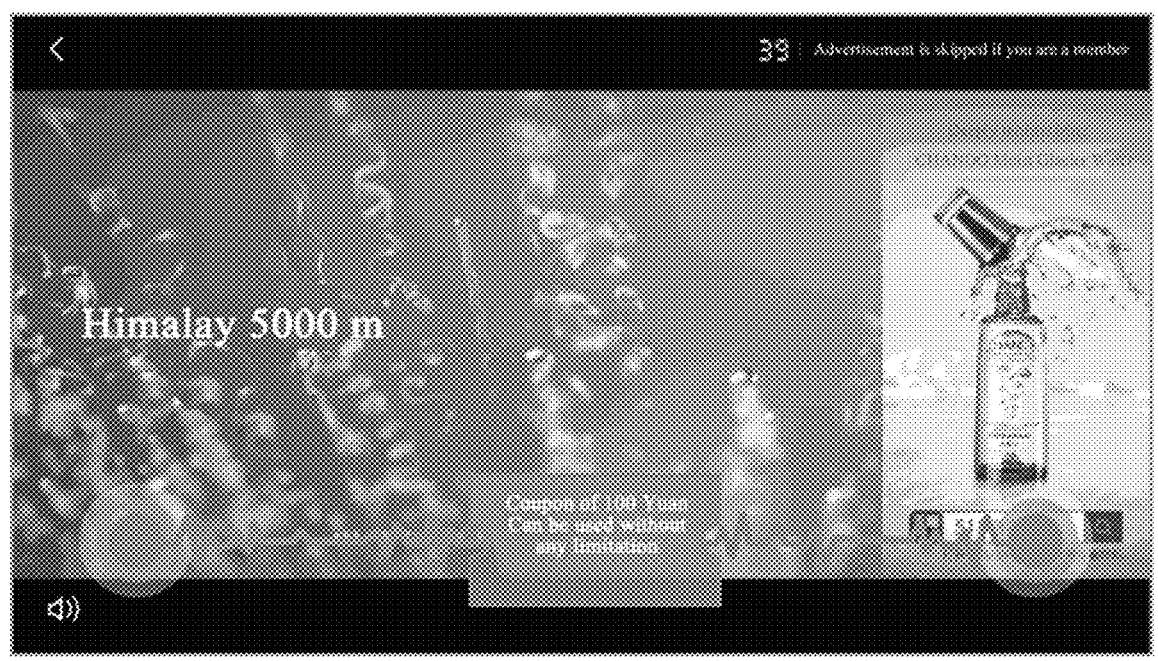
FIG. 18 is another schematic diagram of display effect that a terminal implements an information processing method according to an embodiment.

As shown in FIG. 18, the interaction progress bar extends to the coupon, so that the current interaction status of the terminal A and the terminal B meets an interaction-completion condition.

Figure 19:
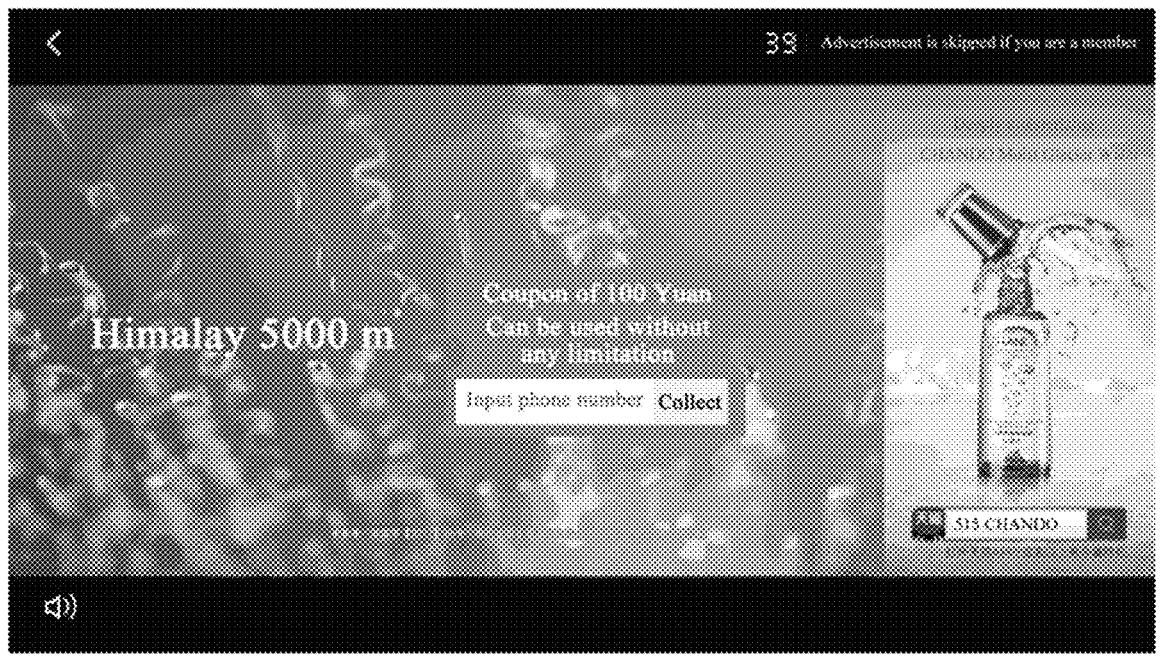
FIG. 19 is another schematic diagram of display effect that a terminal implements an information processing method according to an embodiment.

As shown in FIG. 19, the terminal A receives collecting-information that is of the coupon and sent by the server. On one hand, the collecting-information may notify that the user obtains a qualification for collecting the benefit; and on the other hand, the collecting-information may also prompt how to collect the benefit. The terminal A displaying the collecting-information may include: displaying a link for the user to click to collect; and automatically accumulating bonus points according to a user identity, so as to allow the user to obtain information such as the interaction benefit.

Example 3

Figure 20:
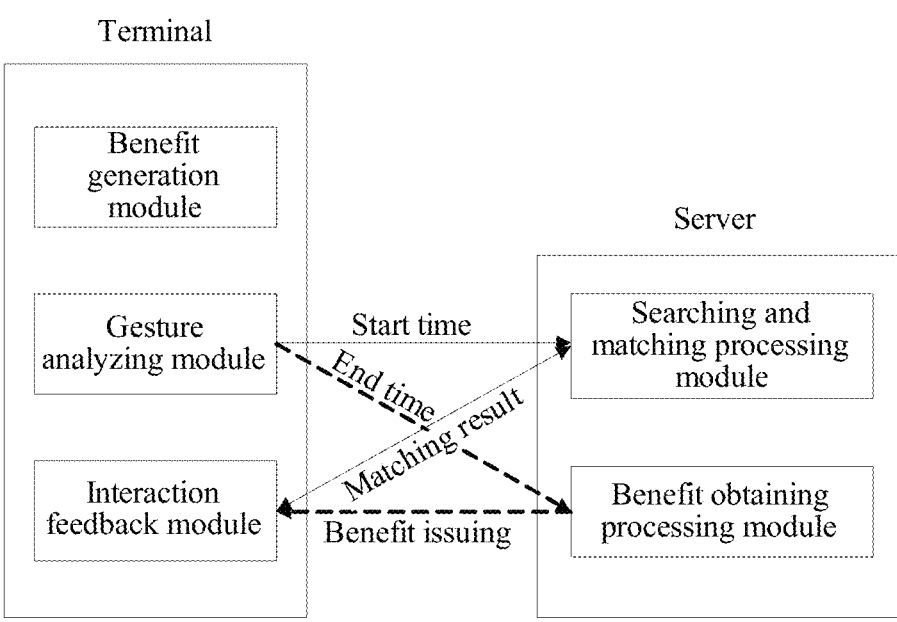
FIG. 20 is a schematic interaction diagram of a terminal and a server according to an embodiment of the present disclosure.

As shown in FIG. 20, a communications system to which the information processing method provided in the present disclosure is applied includes a terminal and a server. The terminal includes a benefit generation module, a gesture analyzing module, and an interaction feedback module. The server includes a searching and matching processing module and a benefit obtaining processing module.

When a plurality of terminals triggers the operation of obtaining the benefit, the plurality of terminals simultaneously send the operation information to the server. As shown in FIG. 9, the server first ranks the terminals according to a time sequence and matches the terminals.

1) If a sending sequence is terminal A, terminal B, terminal C, terminal D, terminal E, terminal F, . . . , the terminal A and the terminal B form a terminal set, the terminal C and the terminal D form a terminal set, the terminal E and the terminal F form a terminal set. Other sequences or sets may be similarly obtained. The terminal A, the terminal B, the terminal C, the terminal D, the terminal E, and the terminal F herein may be a smart television, a mobile phone, a tablet computer, a notebook computer, or a combination of various terminals.

2) If the terminal B breaks off during an interaction process with the terminal A, a waiting time is set (using three seconds as an example). Within the three seconds, the terminal A and the terminal B continue to keep a matching interaction relationship, and can continue the interactive operation of collecting the benefit.

3) If the terminal B breaks off for more than the waiting time (using three seconds as an example) during the interaction process with the terminal A, the terminal A and the terminal B need to return to a queuing state. At this time, if the terminal A still keeps triggering the interactive operation of collection, the terminal A has a right of being preferentially ranked; and if the terminal A releases the triggering action at this time, the terminal A returns to a status at which information is not sent, and needs to queue up again.

Thus, according to the embodiments of the present disclosure, when a size of a video advertisement (including but not limited to a video advertisement) is not affected, more approaches for issuing benefits can be provided for an advertiser, and the user can enjoy pleasure like playing a game during a process of waiting for the advertisement through a method for implementing a double-user interactive advertisement, thereby increasing happiness when the user uses a product.

Example 4

Figure 21:
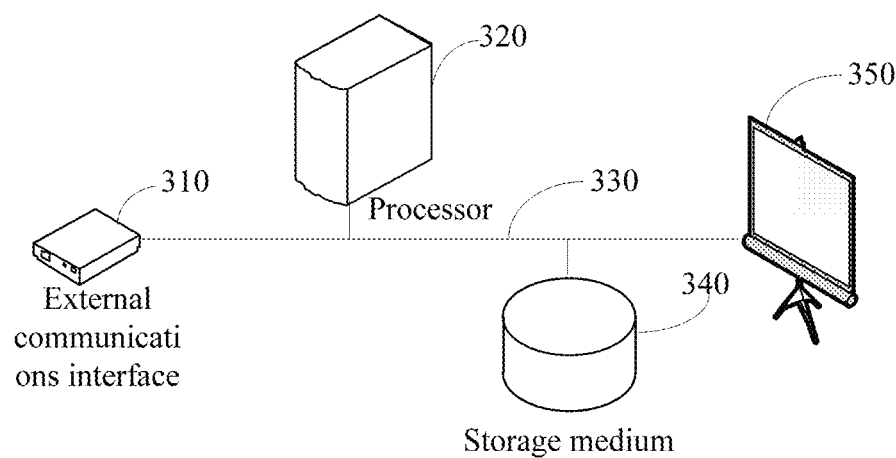
FIG. 21 is a schematic structural diagram of an electronic device according to an embodiment of the present disclosure.

As shown in FIG. 21, an embodiment provides an electronic device that may be the terminal or the server described above. The electronic device includes a processor 320, a storage medium 340, and at least one external communications interface 310. The processor 320, the storage medium 340, and the external communications interface 310 are all connected by using a bus 330. The processor 320 may be an electronic element having a processing function, such as a microprocessor, a central processing unit, a digital signal processor, or a programmable logic array. The storage medium 340 stores computer executable instructions. The processor 320 executes the computer executable instructions stored in the storage medium 340, so as to implement any technical solution of the foregoing information processing method. The electronic device shown in FIG. 21 may be a hardware structure of the foregoing first terminal device, or may be a hardware structure of the foregoing server. When being applied, the electronic device may further include a display 350. The display 350 may be configured to display the information shown in FIG. 3 to FIG. 7 and/or FIG. 15 to FIG. 19.

In the several embodiments provided in the present disclosure, it should be understood that the disclosed device and method may be implemented in other manners. The described device embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections between the components may be implemented by using some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may respectively serve as a unit, or two or more units are integrated into one unit. The integrated unit may be implemented in a number of hardware, or may be implemented in a number of hardware in addition to a software functional unit.

A person of ordinary skill in the art may understand that all or some of the steps of the method embodiments may be implemented by program instructing relevant hardware. The foregoing program may be stored in a computer readable storage medium. When the program runs, the steps of the method embodiments are performed. The foregoing storage medium includes any medium that can store program code, such as: a mobile storage device, a read-only memory (ROM), a random access memory (RAM), a magnetic disc, or an optical disc.

The foregoing descriptions are merely specific implementations of the present disclosure, but are not intended to limit the protection scope of the present disclosure. Any modification made according to the principle of the present disclosure shall fall within the protection scope of the present disclosure.

According to the technical solutions provided in the embodiments of the present disclosure, the interactive prompt may be displayed when the first information for promotion is displayed, so as to notify the user of the interactive operation entered by using the human-computer interaction interface. The terminal sends the operation information to the server based on the interactive operation entered by the user. The server matches two terminals that perform interactive operations on the same first information, and enables the corresponding terminal to display the interaction status. The collecting-information of the collected interaction benefit is displayed when the interaction status meets the interaction-completion condition. On one hand, through information interaction, the user pays more attention to the first information, so that effective propagation of information is improved, and problems that information propagation effect is poor because attention of the user is distracted when the first information is displayed, and effective utilization of a propagation resource that is occupied but propagation effect is not achieved is low are avoided. In addition, through the detection of the interactive operation, the interaction benefit may be issued to the user, so as to improve user experience. Obviously, positive industrial effect is generated. At the same time, the foregoing operation may be easily performed by adding computer executable instructions such as corresponding computer programs in the terminal and the server. Obviously, the present disclosure is easily implemented.

What is claimed is:

1. An information processing method for a first terminal, comprising:
 displaying, by the first terminal, promotion information and an interactive prompt corresponding to the promotion information;
 detecting at a first timepoint, by the first terminal, a first interactive operation formed based on the interactive prompt, to generate first operation information of the first interactive operation;
 sending, by the first terminal, the first operation information to a server;
 receiving, by the first terminal, response information sent by the server based on the first operation information, the response information being also based on second operation information that is detected and generated by a second terminal in response to the promotion information and the interactive prompt displayed on the second terminal;

displaying, by the first terminal, an interaction status based on the response information, the interaction status includes a to-be-issued benefit icon positioned between a first progress bar of the first terminal and a second progress bar of the second terminal, wherein the first progress bar moves in a first direction towards the to-be-issued benefit icon, the second progress bar moves in a second direction towards the to-be-issued benefit icon, and the first direction is opposite of the second direction;

receiving, by the first terminal, colleting-information for collecting the to-be-issued benefit sent by the server, the collecting-information being sent when the server detects that the interaction status meets a preset interaction-completion condition; and displaying, by the first terminal, the collecting-information.

2. The method according to claim 1, further comprising:
displaying, by the first terminal, information of the to-be-issued benefit, wherein the interactive prompt is an operation prompt for collecting the to-be-issued benefit.

3. The method according to claim 1, further comprising:
displaying information of N number of to-be-issued benefits, wherein N is an integer not smaller than 2;
detecting a selection operation of selecting M number of the to-be-issued benefits, wherein M is an integer smaller than N; and
receiving collecting-information of the M number of the to-be-issued benefits.

4. The method according to claim 1, further comprising:
displaying information of the to-be-issued benefit at least partially overlapping a display area of the promotion information, wherein an area overlapping the display area of the promotion information is smaller than the display area of the promotion information.

5. The method according to claim 1, wherein the second terminal and the first terminal meet a preset matching condition.

6. An information processing apparatus, applied to a first terminal, comprising: a memory; and a processor coupled to the memory and configured to perform:
displaying promotion information and an interactive prompt corresponding to the promotion information;
detecting at a first timepoint a first interactive operation formed based on the interactive prompt, to generate first operation information of the first interactive operation;
sending the first operation information to a server;
receiving response information sent by the server based on the first operation information, the response information being also based on second operation information that is detected and generated by a second terminal in response to the promotion information and the interactive prompt displayed on the second terminal;
displaying an interaction status based on the response information, the interaction status includes a to-be-issued benefit icon positioned between a first progress bar of the first terminal and a second progress bar of the second terminal, wherein the first progress bar moves in a first direction towards the to-be-issued benefit icon, the second progress bar moves in a second direction towards the to-be-issued benefit icon, and the first direction is opposite of the second direction;
receiving colleting-information for collecting the to-be-issued benefit sent by the server, the collecting-information being sent when the server detects that the interaction status meets a preset interaction-completion condition; and
displaying the collecting-information.

7. The apparatus according to claim 6, wherein the processor is further configured to perform:
displaying information of the to-be-issued benefit, wherein the interactive prompt is an operation prompt for collecting the to-be-issued benefit.

8. The apparatus according to claim 6, wherein the processor is further configured to perform:
displaying information of N number of to-be-issued benefits, wherein N is an integer not smaller than 2;
detecting a selection operation of selecting M number of the to-be-issued benefits, wherein M is an integer smaller than N; and
receiving collecting-information of the M number of the to-be-issued benefits sent by the server.

9. The apparatus according to claim 6, wherein the processor is further configured to perform:
displaying information of the to-be-issued benefit at least partially overlapping a display area of the promotion information, wherein an area overlapping the display area of the promotion information is smaller than the display area of the promotion information.

10. The apparatus according to claim 6, wherein the second terminal and the first terminal meet a preset matching condition.

11. A non-transitory computer-readable storage medium storing computer program instructions executable by at least one processor of a first terminal to perform:
displaying promotion information and an interactive prompt corresponding to the promotion information;
detecting at a first timepoint a first interactive operation formed based on the interactive prompt, to generate first operation information of the first interactive operation;
sending the first operation information to a server;
receiving response information sent by the server based on the first operation information, the response information being also based on second operation information that is detected and generated by a second terminal in response to the promotion information and the interactive prompt displayed on the second terminal;
displaying an interaction status based on the response information, the interaction status includes a to-be-issued benefit icon positioned between a first progress bar of the first terminal and a second progress bar of the second terminal, wherein the first progress bar moves in a first direction towards the to-be-issued benefit icon, the second progress bar moves in a second direction towards the to-be-issued benefit icon, and the first direction is opposite of the second direction;
receiving colleting-information for collecting the to-be-issued benefit sent by the server, the collecting-information being sent when the server detects that the interaction status meets a preset interaction-completion condition; and
displaying the collecting-information.

12. The non-transitory computer-readable storage medium according to claim 11, wherein the processor is further configured to perform:
displaying information of the to-be-issued benefit, wherein the interactive prompt is an operation prompt for collecting the to-be-issued benefit.

13. The non-transitory computer-readable storage medium according to claim 11, wherein the processor is further configured to perform:
- displaying information of N number of to-be-issued benefits, wherein N is an integer not smaller than 2;
- detecting a selection operation of selecting M number of the to-be-issued benefits, wherein M is an integer smaller than N; and
- receiving collecting-information of the M number of the to-be-issued benefits sent by the server.

14. The non-transitory computer-readable storage medium according to claim 11, wherein the processor is further configured to perform:
- displaying information of the to-be-issued benefit at least partially overlapping a display area of the promotion information, wherein an area overlapping the display area of the promotion information is smaller than the display area of the first promotion information.

15. The non-transitory computer-readable storage medium according to claim 11, wherein the second terminal and the first terminal meet a preset matching condition.

16. The method according to claim 1, wherein a second interactive operation is detected at the second terminal at a second timepoint based on the interactive prompt, and wherein a difference between the first timepoint of the first terminal and the second timepoint of the second terminal is within a preset range.

17. The apparatus according to claim 6, wherein a second interactive operation is detected at the second terminal at a second timepoint based on the interactive prompt, and wherein a difference between the first timepoint of the first terminal and the second timepoint of the second terminal is within a preset range.

18. The non-transitory computer-readable storage medium according to claim 11, wherein a second interactive operation is detected at the second terminal at a second timepoint based on the interactive prompt, and wherein a difference between the first timepoint of the first terminal and the second timepoint of the second terminal is within a preset range.

19. The method according to claim 1, further comprising:
- positioning at least one of the first progress bar, the second progress bar, and the to-be-issued benefit icon to be superposed on the promotion information.

20. The method according to claim 1, further comprising:
- displaying the at least one of the first progress bar, the second progress bar, and the to-be-issued benefit icon to be more transparent than the promotion information as displayed.

* * * * *